United States Patent [19]

Kondo et al.

[11] Patent Number: 5,684,957
[45] Date of Patent: Nov. 4, 1997

[54] NETWORK MANAGEMENT SYSTEM FOR DETECTING AND DISPLAYING A SECURITY HOLE

[75] Inventors: Mariko Kondo; Yumiko Mori; Toshiyuki Tsutsumi, all of Yokohama, Japan

[73] Assignee: Hitachi Software Engineering Co., Ltd., Kanagawa-ken, Japan

[21] Appl. No.: 219,725

[22] Filed: Mar. 29, 1994

[30] Foreign Application Priority Data

Mar. 29, 1993 [JP] Japan .................................. 5-069751

[51] Int. Cl.$^6$ .................................................. G06F 12/00
[52] U.S. Cl. .................... 395/200.06; 395/188.01; 395/183.15
[58] Field of Search ..................... 395/800, 200.06, 395/600, 182.19, 187.01, 188.01, 183.15, 183.13

[56] References Cited

U.S. PATENT DOCUMENTS

| | | | |
|---|---|---|---|
| 4,956,769 | 9/1990 | Smith | 395/600 |
| 5,049,873 | 9/1991 | Robins et al. | 340/825.06 |
| 5,276,789 | 1/1994 | Besaw et al. | 395/140 |
| 5,295,244 | 3/1994 | Dav et al. | 395/161 |
| 5,450,408 | 9/1995 | Phaal | 370/85.13 |
| 5,475,839 | 12/1995 | Watson et al. | 395/650 |

FOREIGN PATENT DOCUMENTS

| | | |
|---|---|---|
| 62-211765 | 9/1987 | Japan . |
| 1-76261 | 3/1989 | Japan . |
| 1-196655 | 8/1989 | Japan . |
| 1-224858 | 9/1989 | Japan . |
| 1-293040 | 11/1989 | Japan . |
| 2-36456 | 2/1990 | Japan . |
| 2-192339 | 7/1990 | Japan . |
| 3-258152 | 11/1991 | Japan . |

*Primary Examiner*—Mehmet B. Geckil
*Attorney, Agent, or Firm*—Fay, Sharpe, Beall, Fagan, Minnich & McKee

[57] ABSTRACT

A network management system can detect a security hole on the network and take necessary measures against such a security hole. When the security hole is detected on the network, the security hole is displayed on a drawing of the network configuration. Further, the network management system displays the status of connection from the outside network, the contents of accesses to the computer and the network device, the status of access to the network environment maintenance file, and the status of login procedures executed with the privileged user.

8 Claims, 41 Drawing Sheets

200 ⋯ COMMUNICATION NETWORK
201 ⋯ COMPUTER
202 ⋯ NETWORK DEVICE
203 ⋯ TERMINAL

FIG. 4

| ID OF DEVICE TO BE MANAGED 400 | CONNECTION INFORMATION 401 | CLASSIFICATION 402 | REMOTE CONTROL 403 | MANAGER 404 |
|---|---|---|---|---|
| 000001 | 000010 | COMPUTER | ○ | mariko |
| 023206 | 023207, 023208 | CABLES | × | tago |
| 398730 | 398729, 398731 | NETWORK DEVICE | ○ | nak |
| ... | ... | ... | ... | ... |

| ID OF DESTINATION DEVICE TO BE MANAGED | ID OF SOURCE DEVICE TO BE MANAGED | COMMUNICATION PROTOCOL |
|---|---|---|
| 000001 | 002387 | PROTOCOL 1 |
| 874983 | 000001 | PROTOCOL 2 |
| 398730 | 000001 | PROTOCOL 3 |
| ⋮ | ⋮ | ⋮ |

800  801  802

F I G. 12
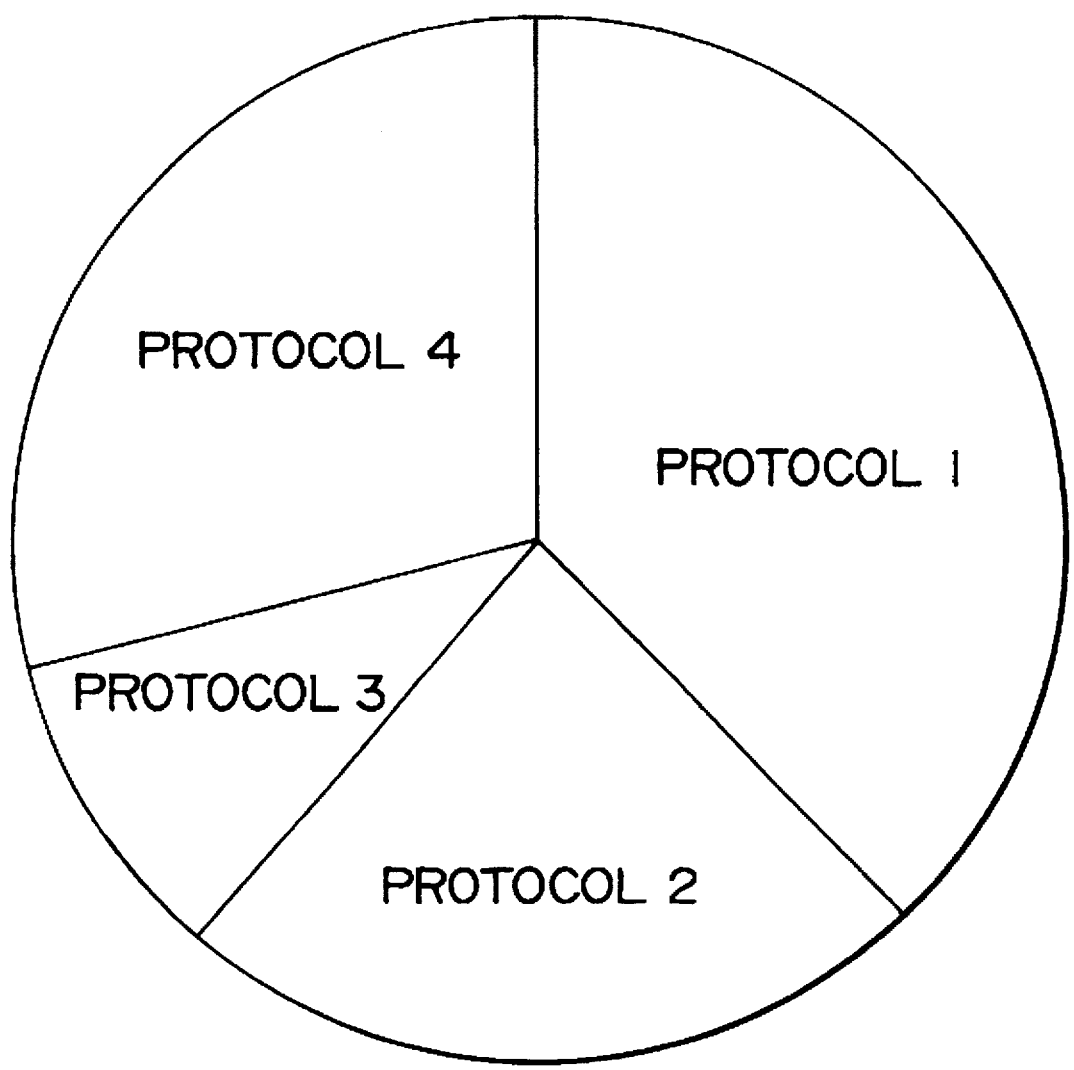

FIG. 14

| 1400 NAMES OF LOGIN USERS | 1401 NAMES OF LOGIN VIRTUAL TERMINALS | 1402 NAMES OF LOGIN TERMINALS | 1403 LOGIN TIMES | 1404 LOGOUT TIMES | 1405 NAMES OF USERS BEFORE LOGIN |
|---|---|---|---|---|---|
| USER 2 | tty 3 | TERMINAL 1 | 92.11.1. 10:10:00 | | |
| USER 3 | tty 2 | TERMINAL 2 | 92.11.1. 10:15:05 | 92.11.1. 12:10:00 | USER 6 |
| root | tty 1 | TERMINAL 1 | 92.11.1. 10:20:30 | 92.11.1. 10:40:30 | USER 2 |
| user 1 | tty 7 | TERMINAL 3 | 92.11.1. 10:23:10 | 92.11.1. 12:40:43 | |
| root | tty 4 | TERMINAL 4 | 92.11.1. 10:29:00 | 92.11.1. 11:00:00 | |
| ... | ... | ... | ... | ... | ... |

140

| NAMES OF COMPUTERS 1500 | NAMES OF USERS 1501 | NAMES OF VIRTUAL TERMINALS 1502 | LOGIN TIMES 1503 |
|---|---|---|---|
| COMPUTER 1 | USER 2 | tty 3 | 92.11.1. 10:10:00 |
| COMPUTER 2 | root | tty 1 | 92.11.1. 10:20:30 |
| ⋮ | ⋮ | ⋮ | ⋮ |

FIG. 18

| ACCESS USERS | ACCESS PROCESS | DATE & TIME OF ACCESS |
|---|---|---|
| nak | read | 92/05/30 |
| mariko | write | 92/06/01 |
| yumiko | write | 92/08/16 |
| ⋮ | ⋮ | ⋮ |

1800, 1801, 1802

180

F I G. 19

| NAMES OF FILES | ACCESS USERS | ACCESS PROCESS | DATE & TIME OF ACCESS |
|---|---|---|---|
| /etc/passwd | nak | read | 92/05/30 |
| /etc/group | mariko | write | 92/06/01 |
| /etc/hosts | yumiko | write | 92/08/16 |
| ... | ... | ... | ... |

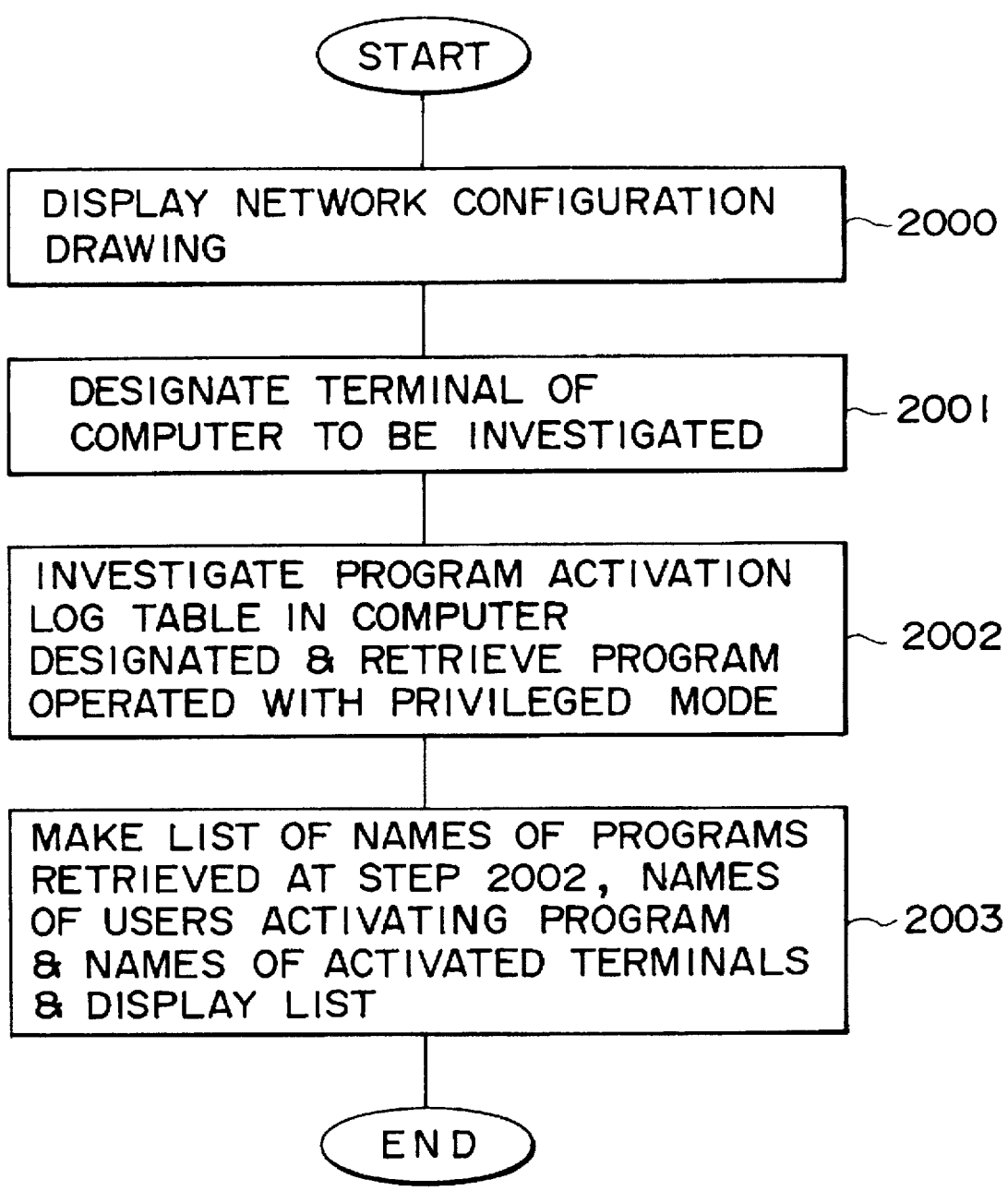

F I G. 21

| NAMES OF USERS ACTIVATING PROGRAM 2100 | NAMES OF ACTIVATED PROGRAMS 2101 | NAMES OF ACTIVATED VIRTUAL TERMINALS 2102 | NAMES OF ACTIVATED TERMINALS 2103 | START TIMES 2104 | END TIMES 2105 | MODE UPON ACTIVATION 2106 |
|---|---|---|---|---|---|---|
| user 2 | prog 10 | tty 3 | TERMINAL 1 | 92.11.1. 10:11:00 | 92.11.1. 10:11:30 | GENERAL |
| user 2 | prog 1 | tty 3 | TERMINAL 1 | 92.11.1. 10:14:30 | | PRIVILEGED |
| user 3 | prog 15 | tty 2 | TERMINAL 2 | 92.11.1. 10:16:30 | | GENERAL |
| user 1 | prog 1 | tty 7 | TERMINAL 3 | 92.11.1. 10:24:00 | | PRIVILEGED |
| root | prog 1 | tty 1 | TERMINAL 1 | 92.11.1. 10:25:00 | 92.11.1. 10:26:00 | PRIVILEGED |
| root | prog 3 | tty 4 | TERMINAL 4 | 92.11.1. 10:29:15 | | PRIVILEGED |
| ... | ... | ... | ... | ... | ... | ... |

| NAMES OF USERS | NAMES OF PROGRAMS | NAMES OF ACTIVATED VIRTUAL TERMINALS | NAMES OF ACTIVATED TERMINALS | START TIMES |
|---|---|---|---|---|
| user 2 | prog 1 | tty 3 | TERMINAL 1 | 92.11.1. 10:15:30 |
| user 1 | prog 1 | tty 7 | TERMINAL 3 | 92.11.1. 10:24:00 |
| root | prog 3 | tty 4 | TERMINAL 4 | 92.11.1. 10:29:15 |
| ... | ... | ... | ... | ... |

| NAMES OF VIRTUAL TERMINALS 2400 | NAMES OF TERMINALS 2401 | LOGIN TIME BANDS 2402 | NAMES OF USERS MAKING LOGIN INTO PRIVILEGED USERS 2403 |
|---|---|---|---|
| tty 1 | TERMINAL 1 | 92.11.1. 10:20:30 ~ 92.11.1. 10:40:30 | user 2 |
| tty 4 | TERMINAL 4 | 92.11.1. 10:29:00 ~ 92.11.1. 10:50:00 | |
| ... | ... | ... | ... |

| NAMES OF VIRTUAL TERMINALS 2500 | NAMES OF LOGIN TERMINALS 2501 | NAMES OF ACTIVATED PROGRAMS 2502 | START TIMES 2503 | END TIMES 2504 | NAMES OF LOGIN USERS 2505 |
|---|---|---|---|---|---|
| tty 1 | TERMINAL 1 | prog 1 | 92.11.1. 10:25:00 | 92.11.1. 10:26:00 | user 2 |
| tty 4 | TERMINAL 4 | prog 3 | 92.11.1. 10:29:15 | | |
| ... | ... | ... | ... | ... | ... |

FIG. 27

| NAMES OF FILES 2700 | USER'S ACCESS RIGHT 2701 | GROUP'S ACCESS RIGHT 2702 | OTHER'S ACCESS RIGHT 2703 | OWNERS 2704 | GROUP OF OWNERS 2705 |
|---|---|---|---|---|---|
| /etc/passwd | 110 | 100 | 100 | root | system |
| /etc/group | 110 | 100 | 100 | root | system |
| /etc/hosts | 110 | 100 | 100 | root | system |
| ... | ... | ... | ... | ... | ... |

| 1 | 1 | 1 | 0 |
|---|---|---|---|

| NAMES OF FILES 2900 | USER'S ACCESS RIGHT 2901 | GROUP'S ACCESS RIGHT 2902 | OTHER'S ACCESS RIGHT 2903 | OWNERS 2904 | GROUP OF OWNERS 2905 |
|---|---|---|---|---|---|
| /etc/passwd | 110 | 110 | 000 | mariko | network |
| /etc/group | 110 | 100 | 000 | nak | DB |
| /etc/hosts | 110 | 000 | 100 | root | system |
| ... | ... | ... | ... | ... | ... |

FIG. 30

| NAMES OF FILES | USER'S ACCESS RIGHT | GROUP'S ACCESS RIGHT | OTHER'S ACCESS RIGHT | OWNERS | GROUP OF OWNERS |
|---|---|---|---|---|---|
| /etc/passwd | 110 | 110 | 000 | mariko | network |
| | 110 | 110 | 100 | root | system |
| ... | ... | ... | ... | ... | ... |

00000001 — 3000
3001, 3002, 3003, 300

F I G. 32

| 3200 | 3201 | 3202 | 3203 |
|---|---|---|---|
| NAMES OF PROGRAMS | OWNERS OF PROGRAMS | OPERABLE USERS | MODE UPON OPERATION |
| prog 1 | root | ALL USERS | PRIVILEGED |
| prog 2 | user 1 | user 1 | GENERAL |
| prog 3 | root | root | PRIVILEGED |
| ⋮ | ⋮ | ⋮ | ⋮ |

320

F I G. 33

| NAMES OF PROGRAMS | OWNERS OF PROGRAMS | OPERABLE USERS | MODE UPON OPERATION |
|---|---|---|---|
| prog 3 | root | root | PRIVILEGED |
| prog 8 | root | root | PRIVILEGED |
| ⋮ | ⋮ | ⋮ | ⋮ |

↑
330

F I G. 34

| NAMES OF PROGRAMS (3400) | OWNERS OF PROGRAMS (3401) | OPERABLE USERS (3402) |
|---|---|---|
| prog 1 | root | ALL USERS |
| ⋮ | ⋮ | ⋮ |

FIG. 36

| NAMES OF COMPUTERS (3600) | NAMES OF MONITORING PROGRAMS (3601) | EXTENT OF SIGNIFICANCE (3602) |
|---|---|---|
| COMPUTER 1 | logic · check | HIGH |
| COMPUTER 1 | police | LOW |
| COMPUTER 1 | program · check | HIGH |
| COMPUTER 2 | login · check | HIGH |
| ⋮ | ⋮ | ⋮ |

SECURITY HOLE TABLE

| ID OF SECURITY 4000 | CONTENTS OF SECURITY HOLE 4001 | ID OF SECURITY MEASURES 4002 |
|---|---|---|
| 1 | USER HAVING UNAUTHORIZED | A |
| 2 | PROCESSING WITH UNAUTHORIZED PRIVILEGED MODE | B |
| 3 | LOGIN TRIAL FROM OUTSIDE NETWORK | C |
| ...... | ...... | ...... |

SECURITY MEASURES TABLE

| ID OF SECURITY MEASURES 4100 | CONTENTS OF INVESTIGATION 4101 | "YES" PROCESSING NO. 4102 | "NO" PROCESSING NO. 4103 |
|---|---|---|---|
| A | PROCESSING IS UNDER OPERATION | 200 | 300 |
| B | USER IS MANAGER | 400 | 100 |
| C | OUTSIDE USER IS ACCEPTED | E | D |
| ..... | ..... | ..... | ..... |

YES/NO PROCESSING TABLE 4200      4201

| PROCESS NO. | CONTENTS OF PROCESSING |
|---|---|
| 100 | SEND MAIL TO MANAGER ABOUT CONTENTS OF SECURITY HOLE |
| 200 | DELETE CORRESPONDING PROCESSING |
| 300 | SEND WARNING MAIL TO USER HAVING CORRESPONDING ACCOUNT |
| ⋮ | ⋮ |

MANAGERS TABLE

| ID | NAMES OF MANAGERS | SECTIONS |
|---|---|---|
| 101 | HANAKO SATO | DESIGN |
| 102 | JIRO TANAKA | PLANNING |
| ⋮ | ⋮ | ⋮ |

4300 — ID
4301 — NAMES OF MANAGERS
4302 — SECTIONS

EXTERNAL USERS TABLE

| ID (4400) | NAMES OF OUTSIDE NETWORK (4401) | NAMES OF USERS (4402) | SECTIONS (4403) |
|---|---|---|---|
| 1000 | UNIVERSITY A | PROF. SUZUKI | SCIENCE |
| 1001 | COMPANY B | DIRECTOR SAITO | SYSTEM |
| ⋮ | ⋮ | ⋮ | ⋮ |

440

NETWORK MANAGEMENT SYSTEM FOR DETECTING AND DISPLAYING A SECURITY HOLE

BACKGROUND OF THE INVENTION

The present invention relates to a computer network in which a plurality of computers and network devices are connected and, more particularly, to a network management system for operating and managing a network smoothly.

In the past several years, development of communication technology serving as the basis of a network has enabled the network configuration to run at a high speed with high reliability. Further, its scale becomes bigger and bigger year by year, and globalization of network use also grows.

Currently, various companies have proposed systems called "Network Management Tools" for improving efficiency of network management operations, and what is common to such tools exists in that management is carried out with a communication protocol, such as SNMP (Simple Network Management Protocol) or CMIP (Common Management Information Protocols).

The network management functions at a protocol level contain the function of monitoring network traffic, the statistics processing function for processing monitored results, the alarm generating function at the time of traffic failures, and so on.

Further, security management systems of a network contain:

1. a device for checking users of a computer system, as disclosed in Japanese Patent Unexamined Publication (kokai) No. 62-211,765;

2. a system for determining an unauthorized entry into an information processing system, as disclosed in Japanese Patent Unexamined Publication (kokai) No. 1-76,261;

3. a system for the prevention of an unauthorized login procedure, as disclosed in Japanese Patent Unexamined Publication (kokai) No. 1-196,655;

4. a system for the prevention of an unauthorized access to a computer and a board device using it, as disclosed in Japanese Patent Unexamined Publication (kokai) No. 1-224, 858;

5. a device for accepting a line connection, as disclosed in Japanese Patent Unexamined Publication (kokai) No. 1-293, 040;

6. a device for the prevention of the unauthorized entry of a hacker, as disclosed in Japanese Patent Unexamined Publication (kokai) No. 2-192,339;

7. a communication servicing system, as disclosed in Japanese Patent Unexamined Publication (kokai) No. 3-258, 152; and 8. a device for the prevention of the unauthorized entry of a hacker and a method for the creation of a key word, as disclosed in Japanese Patent Unexamined Publication (kokai) No. 2-36,456.

As indicated by item 1. above, the device for checking the users of the computer system, as disclosed in Japanese Patent Unexamined Publication (kokai) No. 62-211,765, involves requiring the user using the terminal to enter an ID code, creating a secondary secret code for the ID code at both of the terminal side and the host side with a secret code processing device, and renewing a secret code processing code only when the secondary code created at the terminal side agrees with that created at the host side at a result of comparison between the two secondary codes, thereby enabling the prevention of the unauthorized entry into the computer system.

Further, as indicated by item 2. above, the system for determining the unauthorized entry into the information processing system, as disclosed in Japanese Patent Unexamined Publication (kokai) No. 1-76,261, involves requiring the terminal making a request for connection to enter the user's ID code and transmitting a response signal to the terminal that entered the user's ID code. This system is so arranged as to reject the connection of the terminal when the difference between the pre-stored period of time required for the signal reciprocating, which has been determined from the user's ID code, and the period of time involved with the terminal, from which the requirement had been entered, does not agree with the predetermined time difference.

In addition, as indicated by item 3. above, the system for the prevention of the unauthorized login procedure, as disclosed in Japanese Patent Unexamined Publication (kokai) No. 1-196,655, enables monitoring the operation of a hacker by employing a means for determining trials of executing unauthorized login procedures and a means for carrying out a pseudo-operation against the unauthorized login procedure and prolonging the login time, thereby preventing the hacker from making an unauthorized entry into the host computer.

Additionally, as indicated by item 4. above, the system for the prevention of the unauthorized access to the computer and the board device using it, as disclosed in Japanese Patent Unexamined Publication (kokai) No. 1-224,858, involve requiring the entry of two or more codes when the user attempts to make access to the computer, making a decision as to whether the requirement for access is authorized or unauthorized only when all the codes have been entered. This arrangement can make a combination of the codes complex and thereby make the hacker feel it more difficult to make a search for the right codes.

Furthermore, as indicated by item 5. above, the device for accepting the line connection, as disclosed in Japanese Patent Unexamined Publication (kokai) No. 1-293,040, is so adapted as to prevent the hacker from making an unauthorized access to the computer system by setting information on the authorization of connecting to the computer system in advance and making a decision as to whether to make the connection to the computer system on the basis of the connection authorization information at the time when a message making a requirement for the connection was entered.

Additionally, as referenced by item 6. above, the device for the prevention of the entry of the hacker, as disclosed in Japanese Patent Unexamined Publication (kokai) No. 2-192, 339, involves requiring the entry of the secret code from the terminal twice when the user attempts to make a connection to the computer through a telephone line and disconnecting the line unless the right secret code has been transmitted twice in a predetermined period of time.

Furthermore, as indicated by item 7. above, the communication servicing system in a network system utilizing a public line network, as disclosed in Japanese Patent Unexamined Publication (kokai) No. 3-258,152, is so arranged as to provide only a particular member with communication service by making a decision as to whether to accept the communication service as a result of comparison between the identification of the device and the secret code of the particular member, on the one hand, which are to be transmitted through a telephone device having a secret code ID generating function, and the identification of the device and the secret code of the particular member, on the other hand, which has been registered in advance.

Further, as indicated by item 8. above, the device for the prevention of the entry of the hacker and the method for the creation of the key word, as disclosed in Japanese Patent Unexamined Publication (kokai) No. 2-36,456, involves adding the identification number of the terminal and a password as well as the key word created at the terminal side to a data transmitted from the terminal to the host and disconnecting the line when it is decided as disagreeable as a result of checking the password to be executed by a hacker preventing device, thereby preventing a program with a bug from being transmitted.

Those systems, devices and methods as described hereinabove, however, present various problems and disadvantages, as will be described hereinafter.

A. Detection and Measures of a Security Hole in Network

When various computers and network devices with a network connected therewith are employed, this kind of system should in many cases overcome contradictory problems that unauthorized entry from outside and unauthorized use of a network environment should be prevented, on the one hand, and that there should be created an environment easy and convenient to be employed by all the users entered from every terminal and able to provide them with equal quality of services, on the other hand. In other words, the network configuration can be said to create a security hole on the network.

Hence, some conventional network management systems at the communication protocol level as described hereinabove may be provided with the function of detecting a connecting device having an unauthorized address or determining a user using an unauthorized network from the logon contents of a data travelling on the network. Such systems, however, cannot identify the location of a security hole of the network.

In other words, those conventional network management systems cannot automatically detect the possibility as to whether conditions for making various settings for the network are actually set in a safe way or whether a security checking system is eased partially due to readiness of handling. Hence, it is difficult to provide those conventional network management systems with effective measures in advance for the sake of security.

Further, those network management systems as described hereinabove are generally arranged to display a drawing of a network configuration on the basis of the logical relationship of connection of devices. Thus, they cannot display a physical layout of devices, that is, for example, which device is connected with which device at which department or section on which floor of which building.

B. Early Detection of Unauthorized Entry from Outside and Unauthorized Use from Inside By current technology, it is still very difficult to thoroughly protect and prevent an unauthorized entry into a network from the outside as well as an unauthorized usage from the inside. In order to reduce the possibility of such unauthorized entry and usage to a level as low as possible, those conventional technologies are provided with various devices or systems for carrying out security management in the method as described hereinabove.

These devices and systems are arranged with the attempt to prevent an unauthorized access at the time when the login procedure is carried out from the terminal or when the line is connected; however, they cannot detect the unauthorized use once the unauthorized entry into the network has succeeded.

Further, some conventional network management systems at a communication protocol level, as described hereinabove, can detect the connecting device having an unauthorized address and the unauthorized user employing the network by employing their functions of monitoring a network traffic and processing statistics of the contents of monitoring login procedures.

However, these systems cannot detect and identify what unauthorized thing is done at which portion on the network until a manager detects some abnormal phenomenon and starts investigating a login procedure executed into the network traffic. Hence, they are not suited for the early detection of the unauthorized entry and unauthorized use from outside as well as from inside.

Further, these systems are so arranged as to detect the unauthorized access by a system that depends heavily upon the contents of the traffic data; hence, the unauthorized access cannot be monitored on the basis of a unit of a network user, a unit of the execution right of a user, a unit of a command, a unit of a program or a unit of a process operating on a network device, a unit of a file to be employed for network management, or a unit of a network device.

C. Support for the Configuration of an Appropriate Environment for Use of a Network A majority of the network management systems at the communication protocol, as described hereinabove, have the functions of gathering data travelling on the network and carrying out the processing of statistics for each of the contents and kinds of the data gathered, in order to conduct the management of performance of the network.

It should be noted herein, however, that the management of performance alone cannot configure an appropriate environment for utilizing the network. In other words, they cannot determine in what condition or with what right the application of the computers connected with the network and the network devices including the terminals and so on is to be set.

D. Visual Determination of A Safe Network Environment

Many conventional network management systems at the communication protocol level, as described hereinabove, have the functions of displaying a drawing of a network configuration on the basis of the logical relationship of the connection of the network and displaying what connected network device is currently being operated.

The display of such a drawing of the network configuration to be made by those systems, however, cannot visually determine and identify what network device is operating what command, what program or what process with what right, as well as what network device is provided with what security measures.

SUMMARY OF THE INVENTION

The present invention has the primary object to provide a network management system so adapted as to detect a security hole on a network, display it on a drawing of a network configuration, and take necessary measures against such a security hole on the network.

Further, the present invention has the second object to provide a network management system so adapted as to allow an early detection of an unauthorized entry from outside and an unauthorized use from inside by monitoring the usual status of use of the network, by determining the status of use of the networks by users with a general user right, the status of accesses to a system-related file to be accessible only with a privileged user right, the status of operations of a particular process that allows the privileged user right to be provided at the time of execution, and the status of accesses to the network device with the privileged user right, and by leaving a record of the accesses.

In addition, the present invention has the third object to provide a network management system so adapted as to support the configuration of an appropriate environment for employing the network by checking the appropriateness of the contents of acceptance of various accesses in the network environment and notifying a manager of the network of a statement when the contents of a certain acceptance are decided to be not allowed.

Furthermore, the present invention has the fourth object to provide a network management system so adapted as to visually determine a safe network environment by displaying a network serving as an object of management by the network management system on a drawing of the network configuration.

In order to achieve the primary object as described hereinabove, the present invention consists of a network management system comprising:

a database for storing information relating to a physical arrangement of a network device and a relationship of the connection of the network device;

a display device for displaying a drawing of a network configuration or the like;

a management means for displaying a security hole of the network on said display device by displaying a drawing of a logical network configuration or a drawing of a physical network configuration on the display device on the basis of the information stored in said database, by detecting the security hole of the network, and by displaying the security hole of the network on the drawing of the network configuration in such a display form as complying with contents of the security hole of the network or extent of significance thereof or the like; and a processing means for taking a measure against the security hole of the network.

In order to achieve the second object as described hereinabove, the present invention consists of a network management system comprising:

a display means for displaying the status of a dynamic or logical connection by employing information on a physical network configuration, a logical network configuration, a network wiring layout, a floor drawing, a map, and so on, stored in said database, that is, who currently connects the network with what connection means from what computer or network device or from which external network, or further for displaying the dynamic status of a login procedure executed by a user, that is, displaying who is currently employing which computer or network device from which computer, terminal or network device and what processing is being implemented, when an operation of giving an instruction is given to the computer or the network device or a position thereof displayed on the drawing of the network configuration.

Alternatively, in order to achieve the second object as described hereinabove, the present invention may consist of a network management system which further comprises:

a measurement means for measuring an amount of communication of the network among the computer and the network devices through the network cable;

a classification means for classifying a periodical progress or a variation of the amounts of communication on the basis of the result of measurement or contents of communication;

a computation means for computing a rate or a ratio of an amount of communication for each classification with respect to the total amount of communication; and a display means for displaying the total amount of communication and said rate or ratio thereof in a distinguishable form on said display device on the basis of the result of measurement and the result of classification;

when an instruction is given to the computer, the network device, a network cable, or the like, is displayed on the drawing of the network configuration.

Further, in order to achieve the second object as described hereinabove, the present invention may consist of a network management system comprising:

a storage means for storing a history of access to a file for setting an environment for maintaining a network environment defined with the computer or the network device on the network in the database at optional times;

an extraction means for extracting a history of access made for a predetermined period of time from the history of the access thereto stored in the database, when an instruction is given to the computer or the network device displayed on the drawing of the network configuration; and a display means for displaying a result of extraction, that is, who is executed what change, what reference, or what addition, at what time, on the display device.

Furthermore, in particular, in order to achieve the second object as described hereinabove, the present invention may consist of a network management system which comprises:

a storage means for storing a program or a command at optional times, which fails to agree with a condition for allowing the program or the command to be operated on the network while security is ensured on the network, which is defined with the computer or the network on the network, or which has the possibility to be entered or employed in an unauthorized fashion from outside or inside even if they would agree with said condition, and which is selected from programs or a group of commands, which are currently under operation with the computer or the network device to which an instruction is to be given; and a display means for displaying the status of the operation of the program or the command on the display device, the program or the command failing to agree with the condition for allowing the program or the command to be operated on the network or having the possibility to be entered or employed in an unauthorized fashion from outside or inside even if they would agree with said condition, when the instruction is given to the computer and the network device displayed on the drawing of the network configuration.

In addition, in order to achieve the second object as described hereinabove, the present invention consists of a network management system which still further comprises:

a storage means for storing a history of login procedures to the network executed by a privileged user defined with the computer or the network device on the network in the database at optional times;

an extraction means for extracting a history of the login procedure executed for a predetermined period of time from the history of the login procedures stored in the database when an instruction is given to the computer or the network device displayed on the drawing of the network configuration; and a display means for displaying a result of extraction on the display device, that is, who did what at what time and with what privileged user right from which computer and network device positioned at which location.

In order particularly to achieve the third object as described hereinabove, the present invention consists of a network management system which comprises:

a collating and investigating means for collating and investigating or checking contents of an environment setting file for connecting the network defined by the computer and the network device so as to determine whether the environment has the risk to allow an unauthorized entry or an unauthorized use from the outside and/or inside, on the basis of information relating to a condition of accepting access to the network, stored in advance in the database, when an instruction is given to the computer and the network device displayed on the drawing of the network configuration;

a display means for displaying a result of collating and investigating or checking on the display device; and a means for giving a notice to a manager of the network in accordance with the extent of urgency or significance.

Alternatively, in order to achieve the third object as described hereinabove, the present invention may further consist of a network management system comprising:

a collating or investigating means for collating and investigating or checking programs or commands operable with the computer and the network device on the network to which an instruction is to be given, on the basis of information relating to a condition of allowing an operation of the computer and the network device while ensuring security thereof, with respect to whether a program or a command out of the programs or commands fails to agree with the condition for allowing the program or the command, or the command has the possibility to be entered or employed in an unauthorized fashion from outside or inside even if it would agree with said condition, when the instruction is given to the computer or the network device displayed on the drawing of the network configuration; and a display means for displaying a result of collating and investigating or checking on the display device, that is, which computer and network device may be operated with what program, command or the like, which has the risk to operate the computer and the network device in an unauthorized method.

Further, in order to achieve the fourth object as described hereinabove, the present invention may consist of a network management system comprising a display means for displaying the computer and the network device, each monitoring the network, in accordance with a security level on the drawing of the physical network configuration.

It should be noted that the term "security hole" of the network as referred to herein is intended to mean matters in the network system in which plural network devices are connected, as follows:

1. An access point with an external network;

2. A condition of allowing access to an external network (logical risk of an unauthorized entry);

3. A deviation of contents of communication travelling on the network;

4. An occupancy of the network with a particular user, program, command or the like;

5. A security level or a user right for a program or a group of commands which is or are operated by a user employing a network device connected in the network;

6. A condition of allowing access to a network device other than the computer connected in the network;

7. A condition of allowing access to a program and a command each of which is capable of being activated with a privileged user right defined by the network device connected in the network;

8. A condition of allowing access of the network device connected with the network to information for setting the condition as illustrated hereinabove;

9. A security level and a user right for a program and a group of commands, each being operated in the network;

10. An activation of a program and a command with a privileged user right; and

11. An internal network connected logically, yet excluded from the object of management with the network management system.

The means as described hereinabove to be provided for the network management system according to the present invention can ensure security in the network because the security hole of the network can be detected and displayed on the drawing of the network configuration.

Further, the network management system according to the present invention can discover or detect an unauthorized entry and usage from the outside and/or the inside within a short time because the status of access to the network and the network device is being monitored at all times.

In addition, the network management system according to the present invention can provide the easy configuration of an appropriate environment for employing the network because the contents of the network environment setting file can be collated and checked or investigated on the basis of the condition of allowing access.

Furthermore, the network management system according to the present invention enables one to visually grasp the network status, and provides a safe environment with readiness because the network device serving as the object of network management can be displayed in a readily distinguishable form on the display device.

Other objects, features and advantages of the present invention will become apparent in the course of the description of the preferred embodiments with reference to the accompanying drawings.

BRIEF DESCRIPTION OF THE DRAWINGS

FIG. 4 is a diagram showing an example of the structure of a database according to an embodiment of the present invention, said database storing information on devices to be managed indicating the identification of the device to be managed, access data, classification, remote control, and procedures to be carried out by the manager.

FIG. 8 is a diagram showing an example of a data gathered with respect to the status of access to the computer, in accordance with an embodiment of the present invention.

FIG. 12 is a circle graph showing an example of a rate of the sums of packet sizes for each communication protocol in accordance with an embodiment of the present invention.

FIG. 14 is a table showing an example of a login record table according to an embodiment of the present invention.

FIG. 18 is a table showing an example of the history of access to the network environment maintenance file in accordance with an embodiment of the present invention.

FIG. 19 is a table showing an example of a display of the history of access to the network environment maintenance file in accordance with an embodiment of the present invention.

FIG. 20 is a flow chart showing processing procedures for searching and displaying a program under operation with a privileged mode in accordance with an embodiment of the present invention.

FIG. 21 is a table showing an example of a program activation log table in accordance with an embodiment of the present invention.

FIG. 22 is a table showing an example of the result of investigation of a program under operation with a privileged mode in accordance with an embodiment of the present invention.

FIG. 24 is a table showing an example of the result of retrieval of privileged users, login time bands, login terminals, and the like from a login record table, in accordance with an embodiment of the present invention.

FIG. 25 is a table showing an example of a display of the result of retrieving who has become a privileged user with which terminal at what time and has operated which program, in accordance with an embodiment of the present invention.

FIG. 27 is a table showing an example of a database indicating the setting of an access right to the network environment maintenance file as it should be, in accordance with an embodiment of the present invention.

FIG. 28 is a diagram showing a concept of the setting of an access right in accordance with an embodiment of the present invention.

FIG. 29 is a table showing an example of gathering access rights to the network environment maintenance file in accordance with an embodiment of the present invention.

FIG. 30 is a table showing an example of the result of investigating the access rights to the network environment maintenance file in accordance with an embodiment of the present invention.

FIG. 32 is a table showing an example of a program status table in accordance with an embodiment of the present invention.

FIG. 33 is a table showing an example of a pre-registration table in accordance with an embodiment of the present invention.

FIG. 34 is a table showing an example of the display of the result of retrieval of the programs which can be activated with the privileged mode by the general user in accordance with an embodiment of the present invention.

FIG. 36 is a table showing an example of a monitoring program registration table in accordance with an embodiment of the present invention.

FIG. 40 is a table showing an example of contents of a security hole table of a network management system according to an embodiment of the present invention.

FIG. 41 is a table showing an example of contents of a security measures table of a network management system according to an embodiment of the present invention.

FIG. 42 is a table showing an example of contents of a YES/NO processing table of a network management system according to an embodiment of the present invention.

FIG. 43 is a table showing an example of contents of a manager's table of a network management system according to an embodiment of the present invention.

FIG. 44 is a table showing an example of contents of an external users table of a network management system according to an embodiment of the present invention.

DESCRIPTION OF THE PREFERRED EMBODIMENTS

Figure 1:
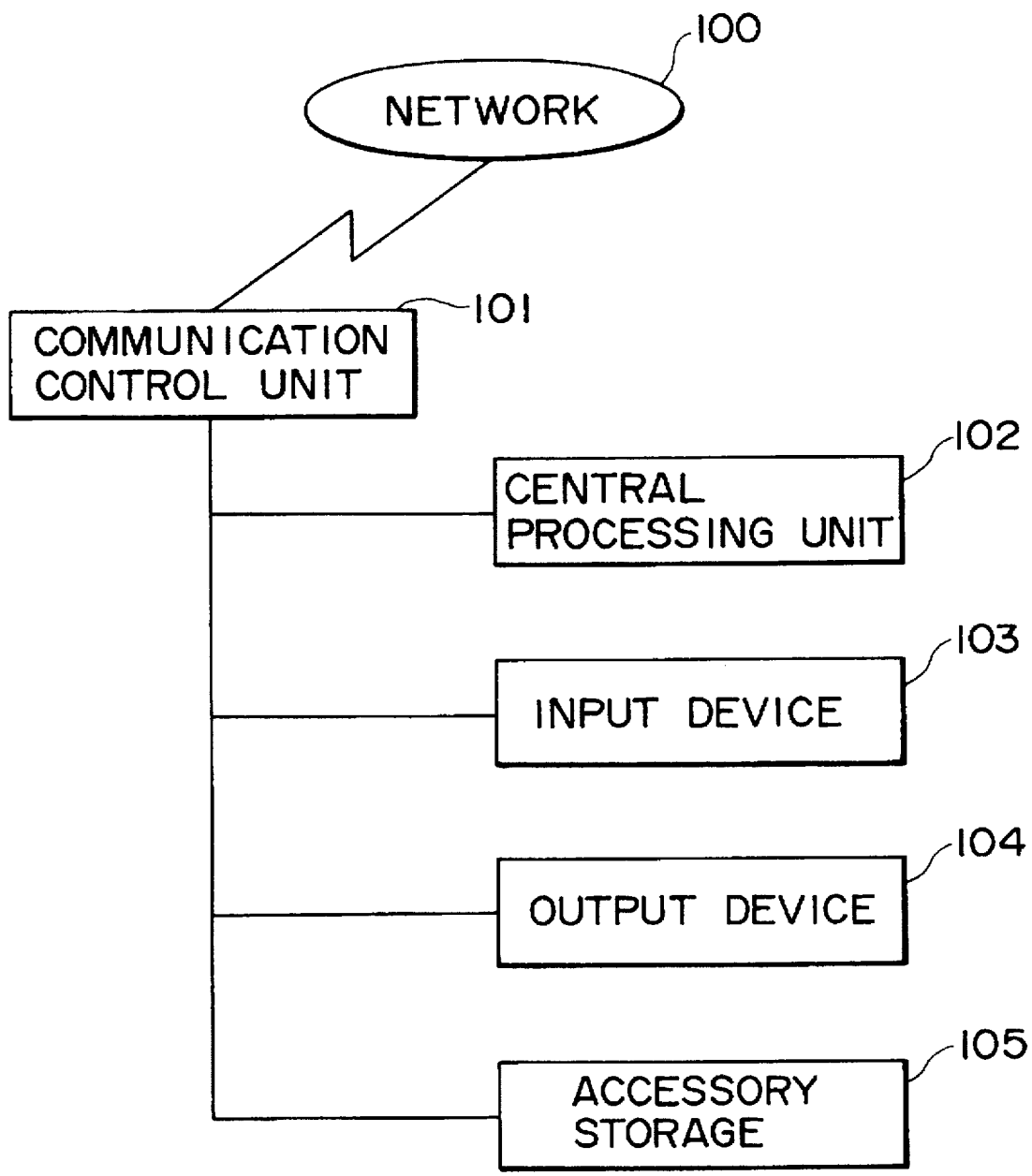
FIG. 1 is a block diagram showing the configuration of a network management system according to an embodiment of the present invention.

FIG. 1 shows an example of the configuration of the network management system according to one embodiment of the present invention.

In FIG. 1, reference numeral 100 designates a network connected through cables with devices to be managed by the network management system according to the present invention, and reference numeral 101 designates a communication control unit for controlling communication between the network management system and the network 100.

Further, reference numeral 102 designates a central processing unit for performing data processing, system control and various processing procedures programmed in advance, reference numeral 103 designates an input device such as, for example, a keyboard, a mouse, a printer or the like, reference numeral 104 designates an output device such as, for example, a display, a printer or the like, and reference numeral 105 designates an accessory storage such as, for example, an optomagnetic disk, a metal tape, a hard disk, or the like.

The device that is to be managed with the network management system according to the present invention is referred to as "device to be managed" or "to-be-managed device" or related words, and such devices to be managed may be classified into six groups including computers, terminals, network devices, peripheral devices, cables and equipment devices.

The computers may include, for example, workstations, personal computers, host computers, file servers, and the like.

The terminals may include, for example, X terminals, character terminals, graphic terminals, and the like.

The network devices may include, for example, routers, repeaters, terminal servers, transceivers, bridgeware, protocol converters, modems, and so on.

The peripheral devices may include, for example, printers, word processors, facsimile machines, scanners, and so on.

The cables may include, for example, Ethernet cables, telephone lines, power cables, and so on.

The equipment devices may include, for example, air conditioners, floor layouts, and building maps.

The network is connected with the devices to be managed so as to allow communication among the devices.

For example, the attributes inherent in the workstation may include, for example, the name of a CPU, processing speed, number of clocks, the name of the running OS, an external interface, a MAC address, name of the logical machine, IP address, memory size, hard disk capacity, extended board, and the like. The attributes inherent in the router may include, for example, the corresponding protocol, communication speed, number of ports, shape of the port, kind of interface, number of extendable slots, and so on.

Further, the attributes inherent in software may include, for example, the name of the product, version, the name of the running OS, operational environment, manual, installment machine, storage location, outline of functions, expenses for a version upgrade, and the like.

The information as describer hereinabove may be registered in advance in a database for products in such a way that the necessary information can be searched and retrieved by designating the name of the product and the name of the model.

In addition to the information on the products as described hereinabove, the network management system according to the present invention may hold the management attributes inherent in each of the individual computers and network devices, such as, for example, purchase prices, shops or companies from which they were purchased, purchase dates, serial numbers, repair history, maintenance expenses and so on.

Further, the network management system according to the present invention can handle, for example, a software environment, machine environment, system configuration, and network traffic relating to the devices to be managed, such as computers, terminals and network devices, as management attributes.

As the attributes of the devices to be managed which are handled with the network management system according to the present invention, there may also be contained, for example, an address in information on equipment, the name of a building, a floor of the building, an area thereof, positions of tables and chairs, position of machines, and so on.

Furthermore, the network management system according to the present invention is provided with means as will be described hereinafter:

a. Database that includes network equipment's data

The devices to be managed and the information on each attribute are to be converted into a database for use with registration and search.

In this case, the information inherent in each product purchased, such as the serial number, presence or absence of a maintenance contract, the name of a shop or company from which to have purchased it, contents of the maintenance contract, and so on, is to be registered in the database upon purchase. Further, the network management system has a user interface for making access to an attributes information database of information on these attributes, and this user interface allows an entry into and renewal of any data from any terminal.

b. Map database

A map database ranging from information on a map throughout the country into a building map in a floor unit can be stored in a hierarchical method by implementing the graphics processing with a CAD/CAM system. This map database can be linked with the network equipment database, thereby providing a user interface that can allow access to information on devices even from a map displayed on the display device.

c. Management of hardware arrangements and network wiring layout arrangements

The network management system according to the present invention can create network wiring arrangements, status of connections, arrangements of power, machine layouts, telephone line layouts, and the like, on the basis of a map stored in the map database.

d. Management of a system configuration

The network management system according to the present invention can check the adaptation of a new computer, which is intended to be purchased, to the objects and purposes of a system configuration by creating a list of the configurations of necessary devices and software.

e. Management of a machine environment

The network management system according to the present invention allows a search for information, for example, as to where is a home directory, what is in which disk, what is a system configuration of a machine, and who has an account.

f. Management of a network environment

The network management system according to the present invention can manage a network environment in a physical sense, that is, it can check, for instance, what machine or terminal is connected in which position, and whether the network standard in Ethernet is met.

g. Software management

The network management system according to the present invention can manage the attributes of relating to software such as, for example, the name of the model, version, running OS, running environment, manual, installment machine, store locations, function layouts, expenses required for a version upgrade, and so on, of the software operable with a computer and network device connected on the network.

h. Management of products inventory

The network management system according to the present invention can be so arranged as to manage, for example, the number of unused cables, connecters, transceivers, terminators, and so on, and a list of lending.

i. Statistics processing

With a network management tool at a communication protocol level associated therewith, the network management system according to the present invention can make statistics of network traffic, an average load of a machine, the status of operations of a printer, and the like, by monitoring the status of a network in a constant fashion.

j. Support for the arrangements of a network

The network management system according to the present invention can diagnose the possibility of the addition of a new network or a device or changes of locations of networks or devices at a physical level. In this case, the diagnosis can be conducted by checking, for example, excess and deficiency of power supply, the number of electric outlets, the restricted length of Ethernet, the number of accessible terminals, and the like.

k. Network monitoring

With a diagnostic type expert system associated therewith, the network management system according to the present invention can give an instruction on measures, for example, for identifying sites of failures at the time of the occurrence of the failures and repairing such failures. Further, it can automatically detect the machine or terminal connected with the network by utilizing a management protocol. In addition, it can detect an abnormality prior to the occurrence of failures from the result of analysis obtained by measuring a load of the host machine or the network, and then it can provide an alarm to the network manager when an abnormality is detected.

l. Network Integration

With the information relating to the network as described hereinabove reviewed in a comprehensive fashion, the network management system according to the present invention can give information, for example, as to what is lacking in the smooth operation of the network or how the network can be operated in a highly efficient way.

Now, a description will be made of the term "network configuration" referred to in this specification.

The term "network configuration" is intended to mean a structure of a network system, that is, to indicate the way or structure of connections of the computers, terminals, network devices, peripheral devices and cables. The network configuration can be divided into a physical network configuration and a logical network configuration, the physical network configuration being the one indicating the status of the connections containing the actual relationship of connection points and distances, and the logical network configuration being the one indicating the status of connection in a logical unit such as, for example, sub-nets or segments.

Figure 2:
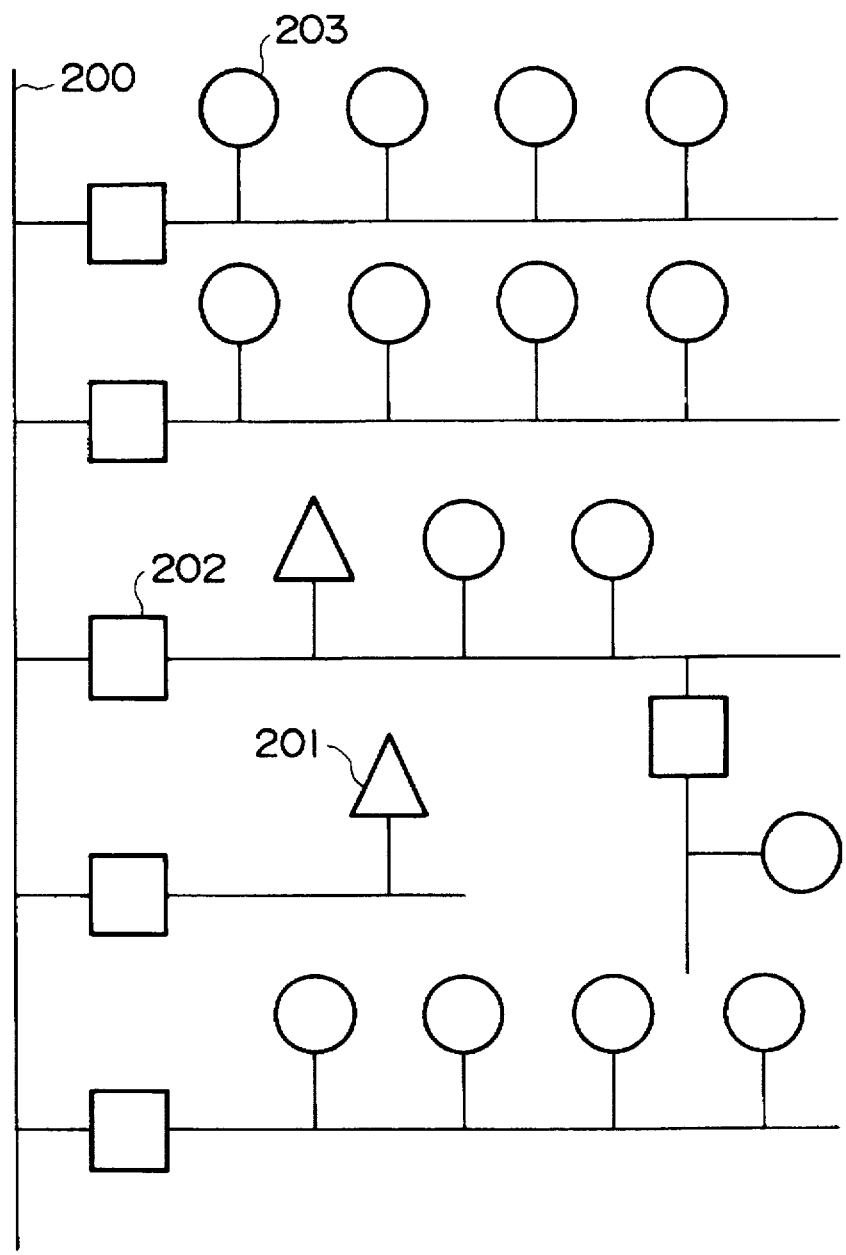
FIG. 2 is a schematic illustration showing the structure of a logical network according to an embodiment of the present invention.

An example of a drawing of the logical network configuration is shown in FIG. 2. In FIG. 2, reference numeral 200 designates a communication network, reference numeral 201 designates a computer, reference numeral 202 designates a network device, and reference numeral 203 designates a terminal.

Part of each computer is provided with the functions of executing an instruction transmitted from another computer connected with the network and re-transmitting the result of execution of the instruction. The network management system can gather the information from the computers connected with the network by utilizing these functions. These functions will hereinafter be referred to as "remote control".

Then, a description will be made of the drawing of the network configuration to be employed for the embodiment of the present invention.

The drawing of the network configuration contains a drawing integrating the physical network configuration and the logical network configuration. The drawing of the network configuration indicates the arrangements of the devices to be managed by the network management system on a map drawn on a certain scale, a building map or a floor drawing. It further illustrates the status of the physical connections of the network with actual distances and areas, containing the arrangements of the cables, power, telephone sets and the like.

More specifically, the drawing of the network configuration is the drawing to be displayed on the output device 104 in FIG. 1 by conducting a search for the necessary information from the physical network configuration, the logical network configuration, the network wiring layouts, the floor drawings, the maps, the statistics information on the network traffic, the rate of usage of the network lines, and other various information, stored in the database in the accessory storage 105 in FIG. 1, in accordance with the position or location, the area or region, the device to be managed, the security level, the purpose, or the like, and then integrating the searched information sought to be gained.

Figure 3:
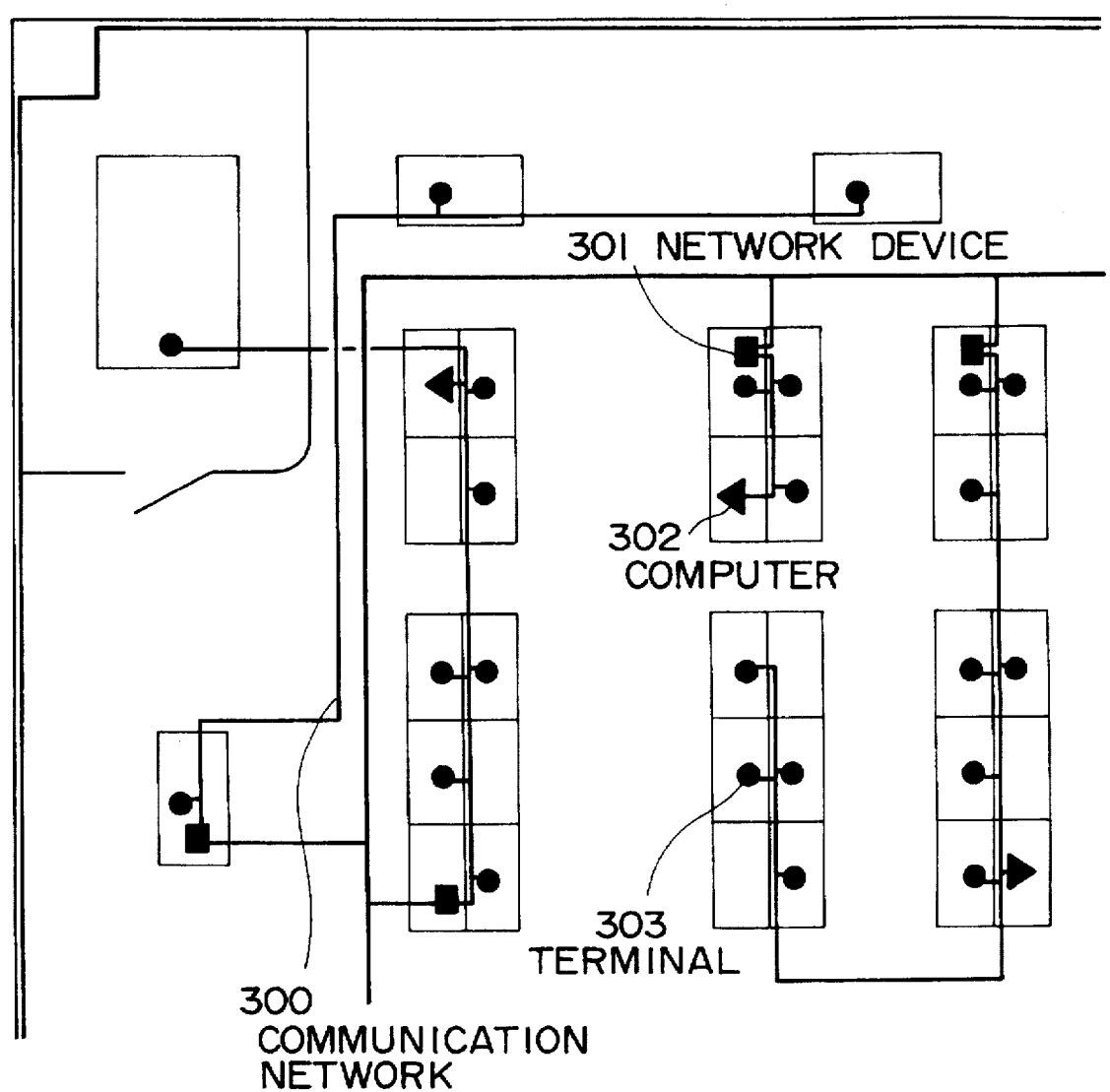
FIG. 3 is a diagram showing an example of a display of the drawing of the network configuration displayed on the display device according to an embodiment of the present invention.

FIG. 3 shows an example of the drawing of the network configuration to be employed for the embodiment of the present invention.

In FIG. 3, reference numeral 300 designates a communication network, reference numeral 301 a network device, reference numeral 302 a computer, and reference numeral 303 a terminal.

The network management system according to the present invention may have a database as will be described hereinafter, in addition to the database storing the information relating to the management attributes as described hereinabove.

FIG. 4 illustrates the structure of a database 40 storing information on the devices to be managed. Reference numeral 400 is the identification (ID) number of the devices to be managed, which can uniformly specify the particular device to be managed.

The ID number 400 for the devices to be managed is assigned to a graphic data indicating the devices to be managed in the drawing of the network configuration to be displayed by the network management system.

In FIG. 4, reference numeral 401 designates connection information that refers to the ID of the devices to be managed which are connected physically and directly.

Further, reference numeral 402 designates a classification that distinguishes and identifies the computers, terminals, network devices, peripheral devices, and cables.

Reference numeral 403 designating the remote control is an item that can identify the remotely controllable device to be managed.

In addition, reference numeral 404 designates the manager that indicates the name of a login procedure implemented by a user managing the corresponding device to be managed. The manager may be plural.

Figure 5:
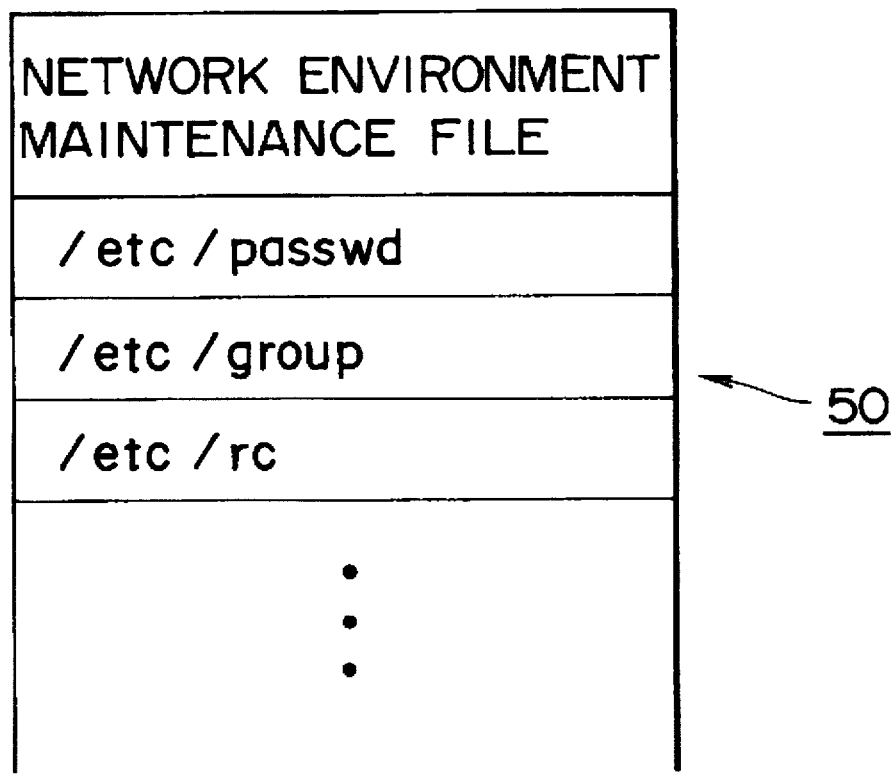
FIG. 5 is a diagram showing an example of the structure of a database according to an embodiment of the present invention, said database having a file necessary for maintaining the network environment registered.

FIG. 5 illustrates an example of the structure of a database 50 that registers a list of the names of files necessary for the maintenance of the network environment. The information stored in the database 50 is registered in advance by the user of the network management system, who is the network manager.

The communication among the devices to be managed on the network is carried out in small units of information, each of which is composed of a communication data that is divided in some constant length. The small units of information are referred to as "packets".

Figure 6:
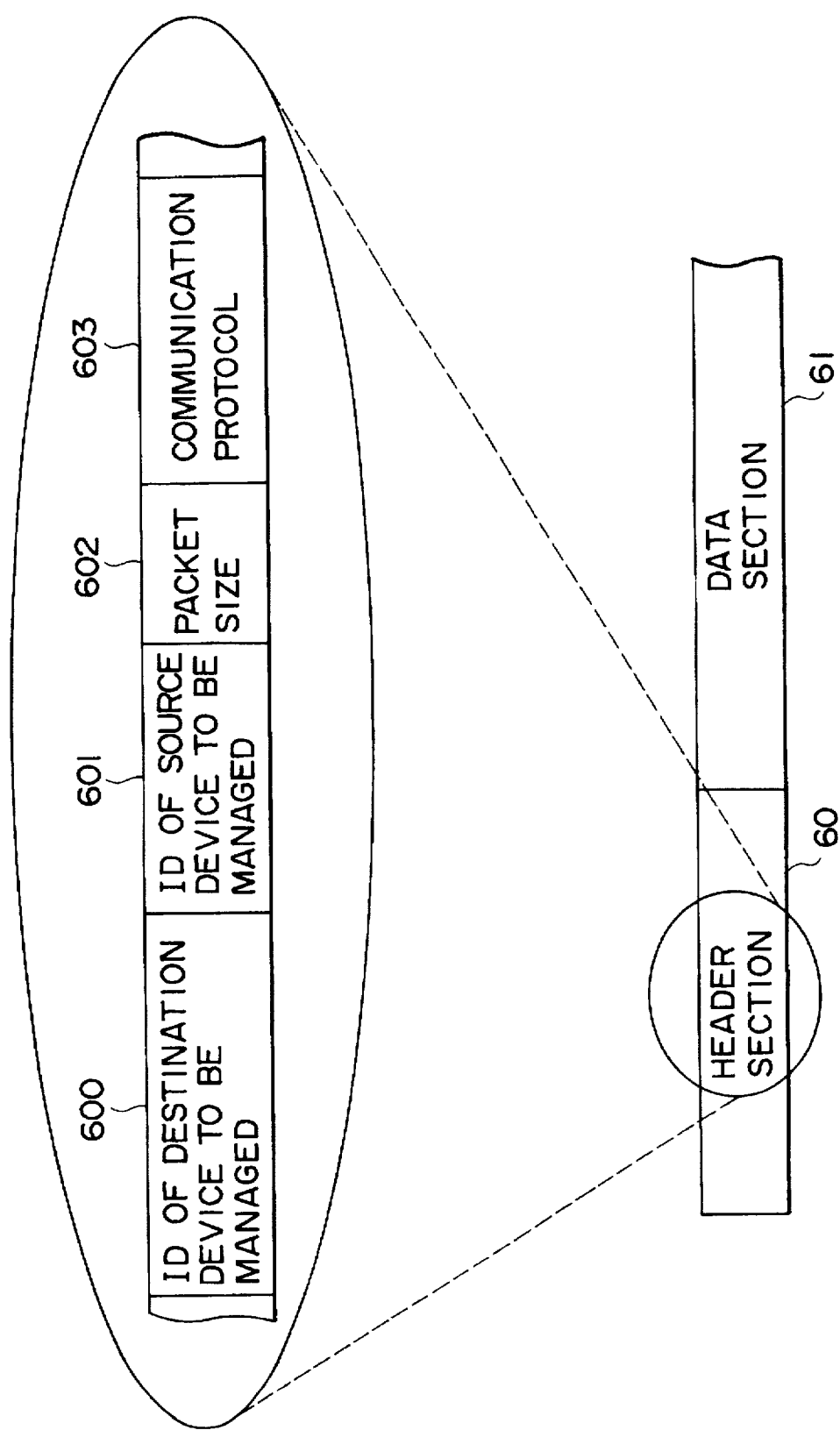
FIG. 6 is a schematic illustration showing an example of the structure of a header section of a packet according to an embodiment of the present invention.

FIG. 6 illustrates an example of the structure of a packet. The packet can be divided roughly into two sections. More specifically, the packet comprises a header section 60 and a data section 61, the header section 60 being so adapted as to store control information necessary for transmission and receipt of information and the data section 61 being so adapted as to store information sought to be actually transmitted and received. The header section 60 contains a variety of control information and it may comprise the IDs of the destination devices to be managed, as indicated by reference numeral 600, the IDs of the source devices to be managed, as indicated by reference numeral 601, packet sizes (byte number) 602, and communication protocols 603.

Figure 7:
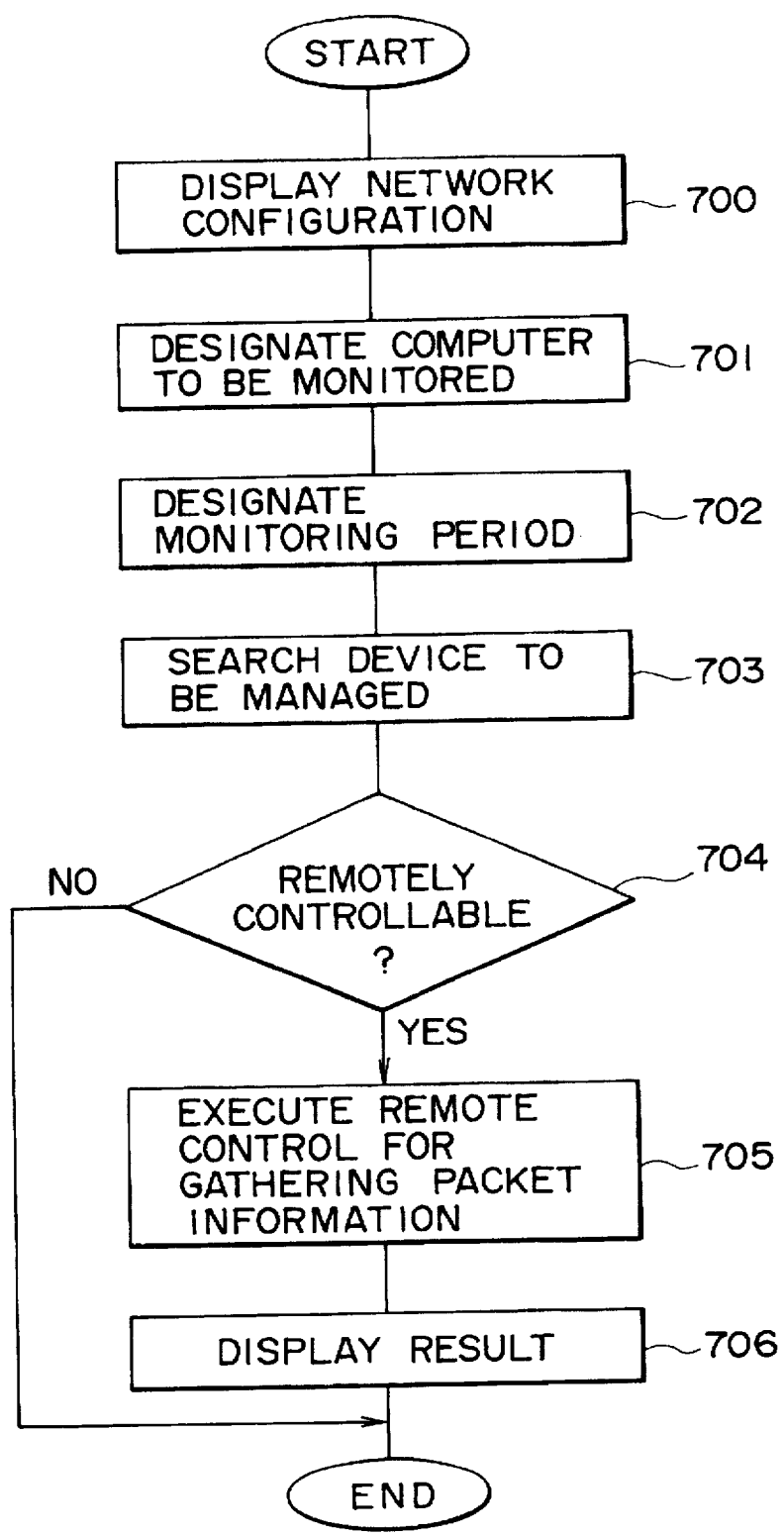
FIG. 7 is a flow chart showing an example of processing procedures according to an embodiment of the present invention, said procedures displaying whether access of which device to be managed to the computer is displayed.

Now, with reference to the flow chart as shown in FIG. 7, a description is made of the processing procedures for displaying the status of access to the computer as the device to be managed through a remote login process or a file transfer process from other plural computers.

All remotely controllable computers on the networks are arranged so as to gather and record part of each of the header sections of the packets travelling on the networks at all times. The gathering and recording are to be executed by remotely controlling the network management system.

First, at step 700 in FIG. 7, the network management system displays the network configuration on the output device 104.

Then, at step 701, the computer to be monitored is designated through the input device 103 by the user.

Thereafter, at step 702, the period of time during which the monitoring is to be continued is designated, followed by proceeding to step 703 at which a search is made for information on the device to be managed from the database 40 in FIG. 4 on the basis of the ID of the device to be managed for the computer to be monitored.

Then, step 704 determines if the designated computer can be controlled remotely. When the result of this step indicates that the computer involved can be remotely controlled, then the program flow goes to step 705. On the other hand, if the decision at step 704 gives the negative result, then the processing ends.

At step 705, the remote control is executed in order to transmit the data gathered during the period of time designated at step 702 to the network management system by means of the ID of the device to be managed for the designated computer.

The data gathered at this time may contain the ID of the destination device to be managed, as indicated by reference numeral 600, the ID of the source device to be managed, as indicated by reference numeral 601, and the communication protocol 603.

FIG. 8 illustrates an example of the data gathered. In FIG. 8, reference numeral 800 designates IDs of the destination devices to be managed, reference numeral 801 designates IDs of the source devices to be managed, and reference numeral 802 designates communication protocols.

Then, at step 706, the gathered data transmitted to the output device 104 at step 705 is displayed as a result.

Figure 9:
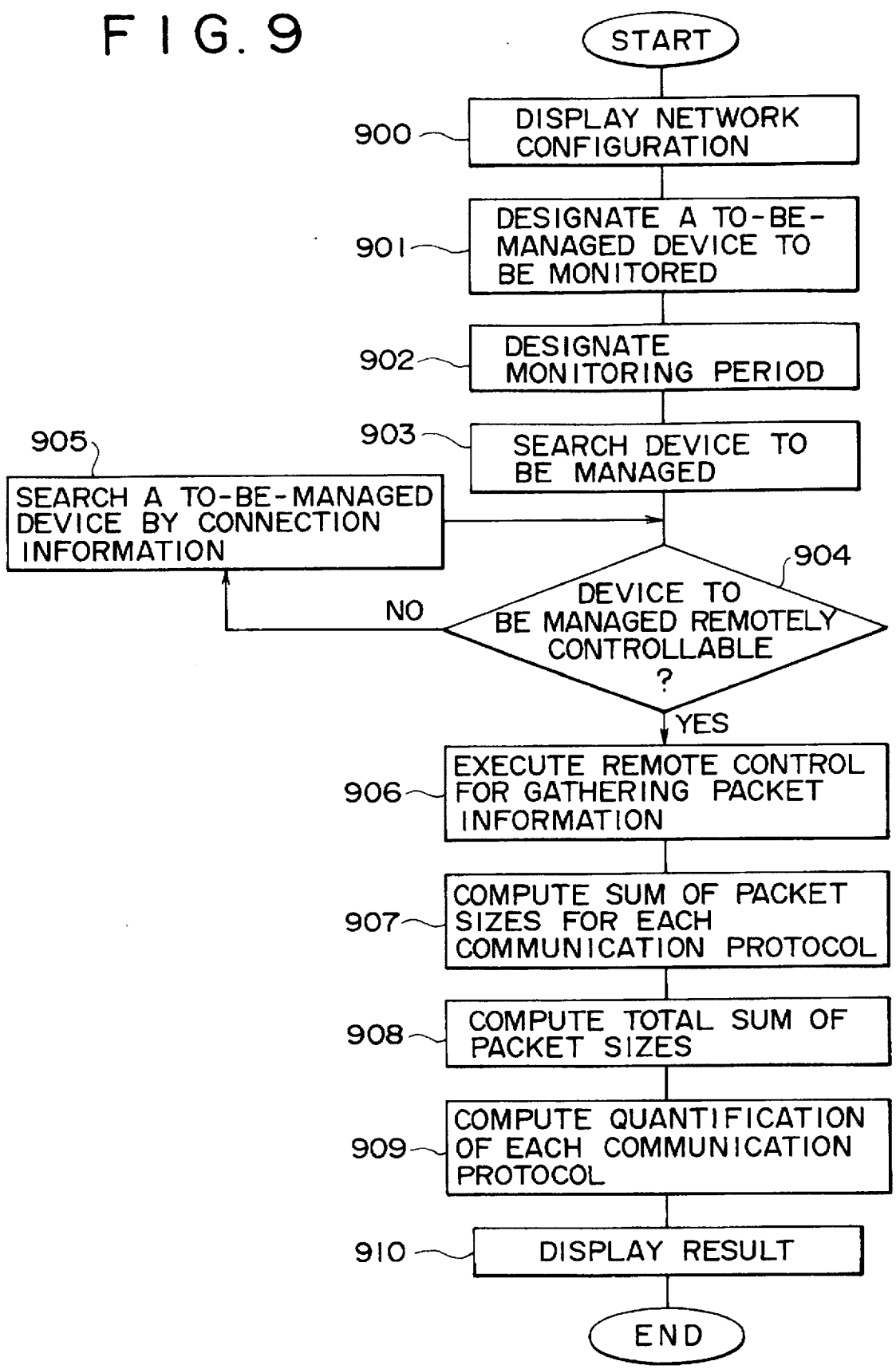
FIG. 9 is a flow chart showing an example of processing procedures according to an embodiment of the present invention, said procedures being for displaying an amount of communication or a ratio of amounts of communication for each communication protocol of a packet travelling through a device to be managed, in accordance with an embodiment of the present invention.

Referring now to the flow chart in FIG. 9, a description will be made on the processing procedures for displaying the amount and the ratio of amounts for each of the communication protocols of packets travelling through the devices to be managed.

All remotely controllable computers on the networks are arranged so as to gather and record part of each of the header sections of the packets travelling on the networks at all times. The gathering and recording are to be executed by remotely controlling the network management system.

First, at step 900, the network configuration is displayed on the output device 104 with the network management system, followed by proceeding to step 901 at which the computer to be monitored is designated through the input device 103 by the user as an object of monitoring and then to step 902 at which the period of time during which the monitoring is to be continued is designated by the user.

Thereafter, at step 903, a search is made for information on the device to be managed from the database 40 in FIG. 4 on the basis of the ID of the device to be managed which is designated at step 901.

Then, step 904 determines if the designated device to be managed can be controlled remotely.

When the result of this step indicates that the computer involved is not controlled remotely, then the program flow goes to step 905. On the other hand, when it is decided at step 904 that the computer can be remotely controlled, then the program flow goes to step 906.

At step 905, the information on the device to be managed is searched from the database 40 as shown in FIG. 4 on the basis of the connection information of the device to be managed which was investigated at step 904.

If the connection information contains the plural IDs of the devices to be managed, the top ID of the device to be managed is employed.

The processes at steps 904 and 905 are repeated until the remotely controllable device to be managed is discovered.

At step 906, the remote control is executed in order to transmit the data gathered during the period of time designated at step 902 to the network management system by means of the ID of the device to be managed which was searched for at step 904.

Figures 10, 11:
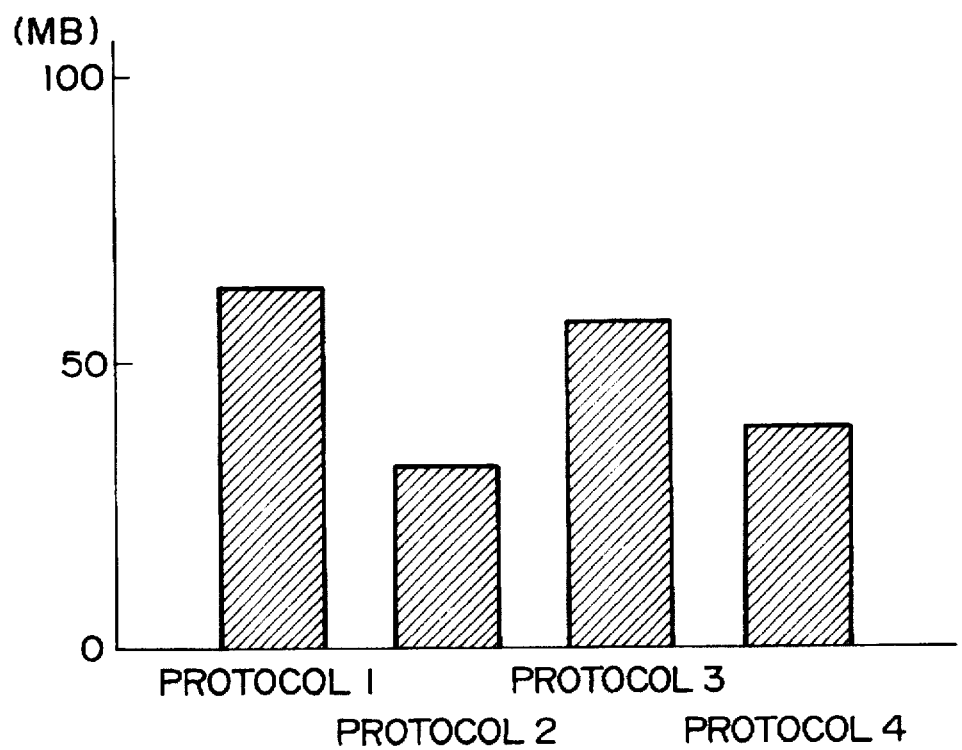
FIG. 10 is a diagram showing an example of a data gathered in a packet size and a communication protocol of a packet travelling through a database, in accordance with an embodiment of the present invention.
FIG. 11 is a bar graph showing an example of the sum of packet sizes for each communication protocol in accordance with an embodiment of the present invention.

The data gathered at this time may contain the packet size and the communication protocol. FIG. 10 illustrates an example of the gathered data that comprises a packet size 1000 and a communication protocol 1001.

Then, at step 907, the sum of packet sizes for each communication protocol is computed on the basis of the gathered data as shown in FIG. 10.

Further, at step 908, the total sum of the packet sizes of the communication protocols is computed on the basis of the sum of the packet sizes for each communication protocol computed at step 907.

Thereafter, at step 909, a ratio or rate is computed by dividing the sum of the packet sizes of each communication protocol computed at step 907 with the total sum computed at step 908.

At step 910, the results obtained at step 907 and step 908 are displayed in the form of a graph. FIG. 11 illustrates a display example of a bar graph indicating the total sum of the packet sizes for each communication protocol and FIG. 12 illustrates a display example of a pie chart indicating the rates of the total sum of the packet sizes for each communication protocol. It is to be noted herein that there is no limitation to the kinds of display for displaying the results as obtained at step 907 or step 909.

Figure 13:
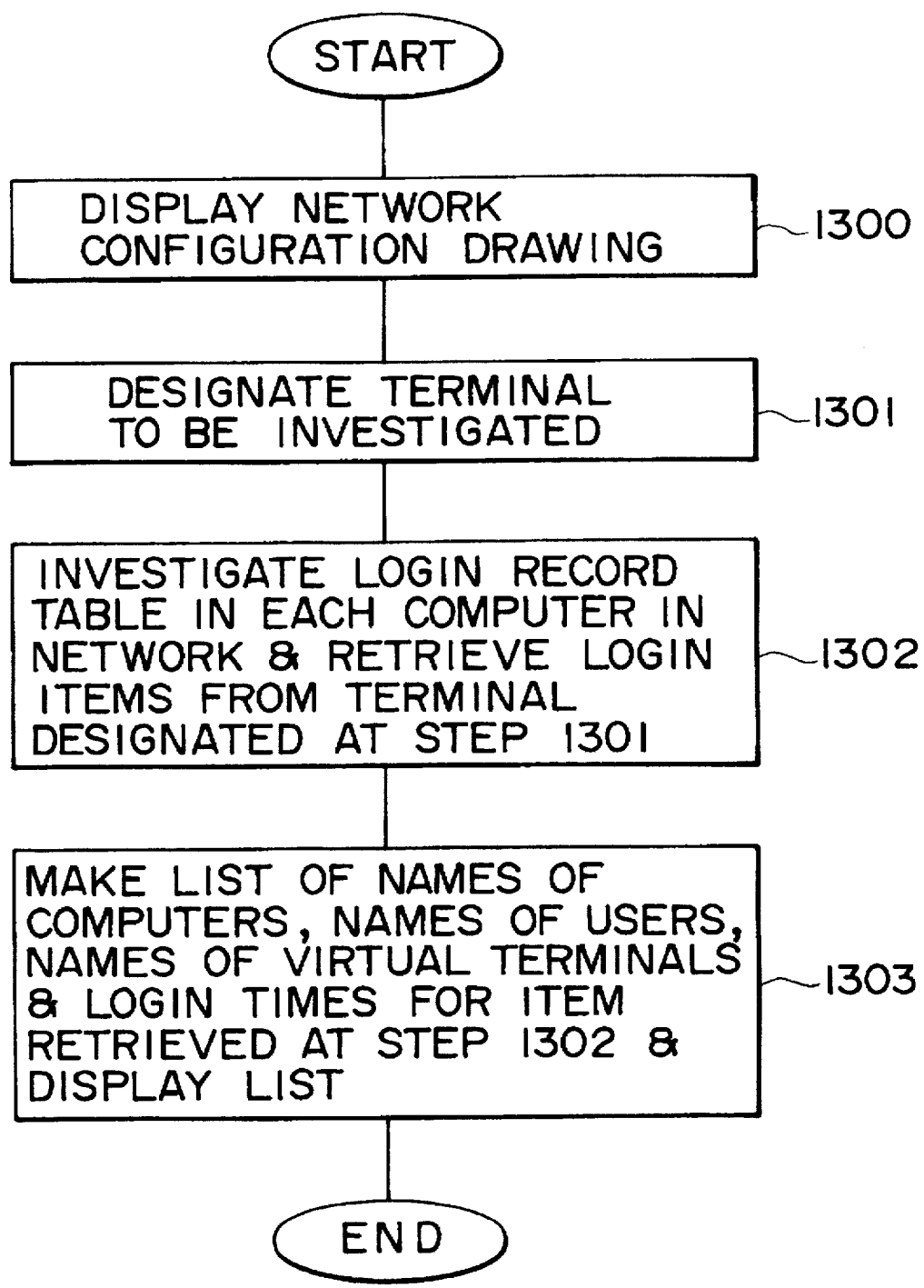
FIG. 13 is a flow chart showing processing procedures for displaying the result of investigation of login procedures to be implemented by which user into which computer from a terminal designated, in accordance with an embodiment of the present invention.

Turning now to the flow chart as shown in FIG. 13, a description is made of the processing procedures for investigating information on a login procedure accessed to the computer from the particular terminal by the user and displaying it on the output device of the computer. The terminal and the output device are referred to herein merely as the "terminal" in general, with reference to FIGS. 2, 3, 14 and 15.

FIG. 14 illustrates an example of a login records table 140 that is a table indicating a record of login procedures accessed into each of the computers and that is held by each computer. The login records table 140 contains names of login users 1400, names of virtual terminals 1401, names of login terminals 1402, login times 1403, logout time 1404, and names of users prior to login (names of the users 1400 who took a login procedure without taking a logout procedure after having executed the login procedure into a certain user), as indicated by reference numeral 1405. It should be noted herein that, when the login procedure is under process, the logout time 1404 is kept blank.

Figures 15, 16:
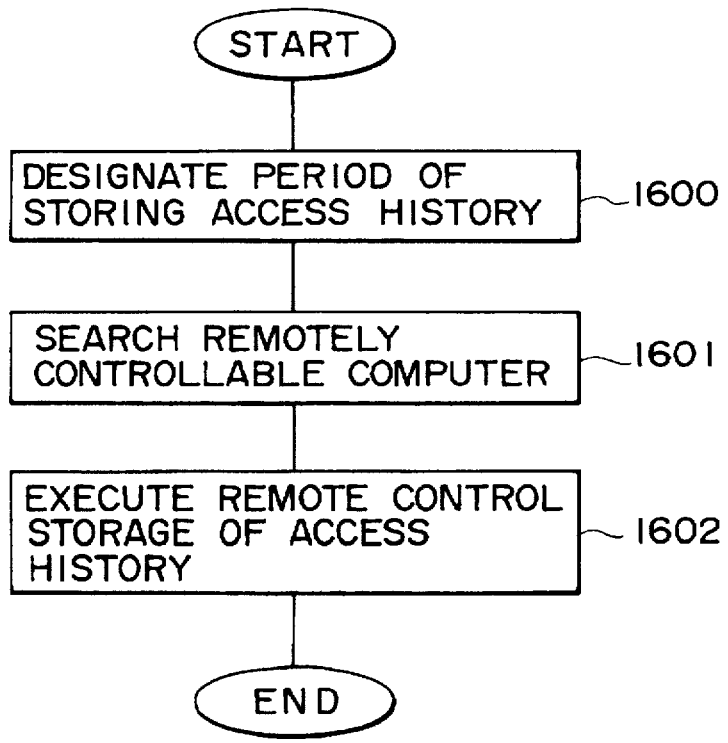
FIG. 15 is a table showing an example of displaying the result of investigation indicating the login procedures into which computer to be executed by which user from a designated terminal in accordance with an embodiment of the present invention.
FIG. 16 is a flow chart showing processing procedures to be executed in advance for storing a history of access to a network environment maintenance file in accordance with an embodiment of the present invention.

FIG. 15 illustrates an example of displaying the result of retrieval of the login procedures accessed to the computers from the designated terminal with the designated name of the user. The display example indicates the names of computers 1500, names of login users 1501, names of virtual terminals 1502 employed for the login procedures, and login times 1503.

First, at step 1300 in FIG. 13, the drawing of the logical network configuration as shown in FIG. 2 or the physical drawing of the network configuration as shown in FIG. 3 is displayed on the output device.

Then, at step 1301, the terminal 203 sought to be investigated by the system user is designated.

Thereafter, at step 1302, the network management system investigates the login records table 140 of each of the computers in the networks, thereby detecting the login items from the terminal 203 designated at step 1301.

What is detected at step 1302 is the active login item (i.e. the table with the column 1404 in FIG. 14 kept blank) from the login records table 140. The virtual terminal referred to herein is intended to mean a logical terminal when considered on the computer side. More specifically, although the terminal is one in a physical or actual sense, it is employed as plural terminals for software. For instance, this arrangement corresponds to the instance where plural windows are treated each as one terminal. In this case, one name is assigned to one login. In other words, when plural login procedures are executed from a certain terminal, the computer involved assigns the different name of terminal to each of the login procedures as if the login procedures were executed from plural terminals. In summary, each of the terminals which are assumed to be actual ones is referred to as a "virtual terminal".

Then, the program flow goes to step 1303 at which the item detected at step 1302 is displayed on the output device in such a method as shown in FIG. 15. More specifically, the item displayed at step 1303 comprises a list of names of computers 1500, names of users 1501, names of virtual terminals 1502, and login times 1503.

Figure 17:
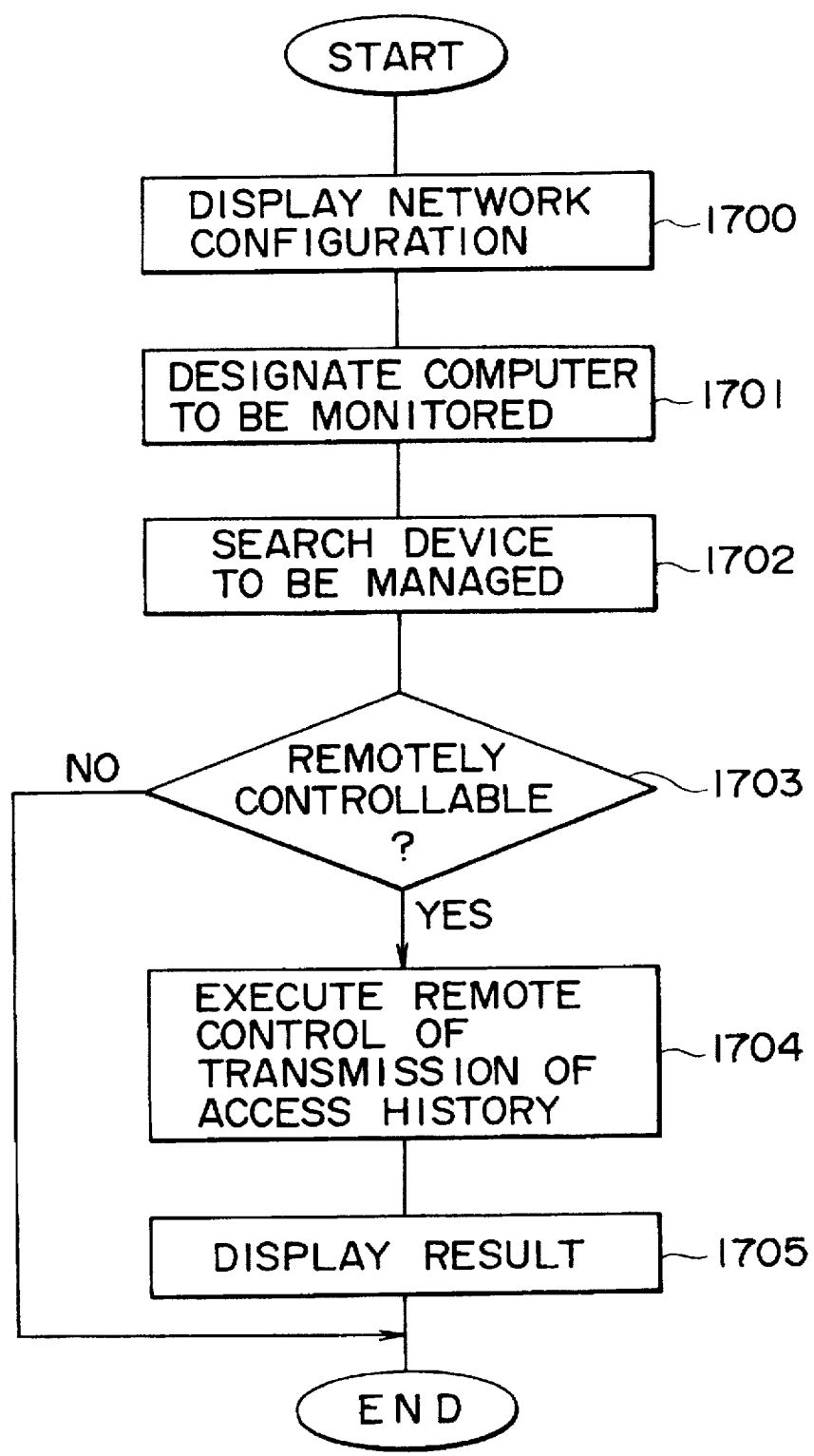
FIG. 17 is a flow chart showing processing procedures for displaying the history of access to the network environment maintenance file in accordance with an embodiment of the present invention.

Now, a description will be made of the processing procedures for monitoring the history of accesses to files necessary for the maintenance of the network environment in accordance with the flow charts as shown in FIGS. 16 and 17 with reference to FIG. 18.

First, the processing to be executed in advance by the network management system for the storage of the access history is described with reference to FIG. 16.

At step 1600, the network management system allows the user to designate the period of time for which to store the history of accesses. Then, at step 1601, a search is made for all information on the remotely controllable computers as the devices to be managed from the database 40 as shown in FIG. 4.

Then, at step 1602, the remote control is executed in order to store the information on the history of the accesses to the file registered in the database 50 as shown in FIG. 5 in the computer to be controlled remotely for the period of time designated at step 1601 by means of the IDs of the devices to be managed for all the remotely controllable computers searched at step 1601.

FIG. 18 illustrates the results stored at step 1602, i.e. an example of access history information 180 that comprises access users 1801, access procedures 1802, and access dates 1803.

Then, turning to the flow chart of FIG. 17, the processing procedures for displaying the access history is described.

First, at step 1700, the network management system displays the network configuration on the output device 104, followed by proceeding to step 1701 at which the user designates the computer to be monitored through the input device. Then, at step 1702, a search is made for information on the device to be managed from the database 40 in FIG. 4 on the basis of the ID of the device to be managed for the designated computer.

Thereafter, step 1703 determines if the designated computer is controllable remotely. When it is decided that the computer involved is to be remotely controlled, then the program flow goes to step 1704; on the other hand, if it is decided that the computer involved is not remotely controllable, then the program ends.

At step 1704, the remote control is carried out in order to transmit the access history information 180 on the history of accesses to the file for the database 50 in FIG. 5 to the network management system on the basis of the ID of the device to be managed for the remotely controllable computer.

Then, at step 1705, the access history information transmitted to the network management system at step 1704 is displayed on the output device, and FIG. 19 illustrates an example of a display of the accesses history information.

Referring now to the flow chart of FIG. 20, a description is made of the processing for searching and displaying the program under operation with a privileged mode with reference to FIGS. 2, 3, 21 and 23.

FIG. 21 illustrates an example of a program activation log table 210 that is so adapted as to record information on the programs activated by each of the computers, and this table is held by each computer. The program activation log table 210 comprises names of users activating programs, as indicated by reference numeral 2100, names of activated programs 2101, names of activated virtual terminals 2102, names of activated terminals 2103, activation times 2104, terminated times 2105, and modes upon activation, as indicated by reference numeral 2106. While the program is under operation with such a privileged mode, the box of the terminated time 2105 is kept blank.

FIG. 22 illustrates an example of displaying the results of retrieving the programs under operation with the privileged mode, and the displayed results comprise names of programs 2200, names of users 2201, names of activated virtual terminals 2202, names of activated terminals 2203, and activation times 2204.

The program in the privileged mode is intended to mean a program that is operable in a privileged method with respect to other programs and files. Specifically, a privileged operation may include, for example, an operation that allows the particular user to rewrite a file inhibiting the write process by general users and an operation that allows the particular user to terminate the operation of the program activated by other users.

First, at step 2000 in FIG. 20, the drawing of the logical network configuration as shown in FIG. 2 or the drawing of the physical network configuration as shown in FIG. 3 is displayed on the output device.

Then, at step 2001, the user of the network management system designates the computer sought to be investigated.

Thereafter, at step 2002, all the program activation log tables, as shown in FIG. 21, held by the computer designated at step 2001, are investigated, thereby detecting the program that is being operated with the privileged mode.

In other words, what is retrieved at step 2002 is the program with its termination time kept blank, that is, the program that is under operation.

The program flow then goes to step 2003 at which the network management system displays a list for the program retrieved at step 2002, as shown in FIG. 22, the list comprising names of programs 2201, names of users activating the program, as indicated by reference numeral 2200, names of virtual terminal activating the program, as indicated by reference numeral 2202, names of terminals activating the program, as indicated by reference numeral 2203, and times of activating the program, as indicated by reference numeral 2204.

Figure 23:
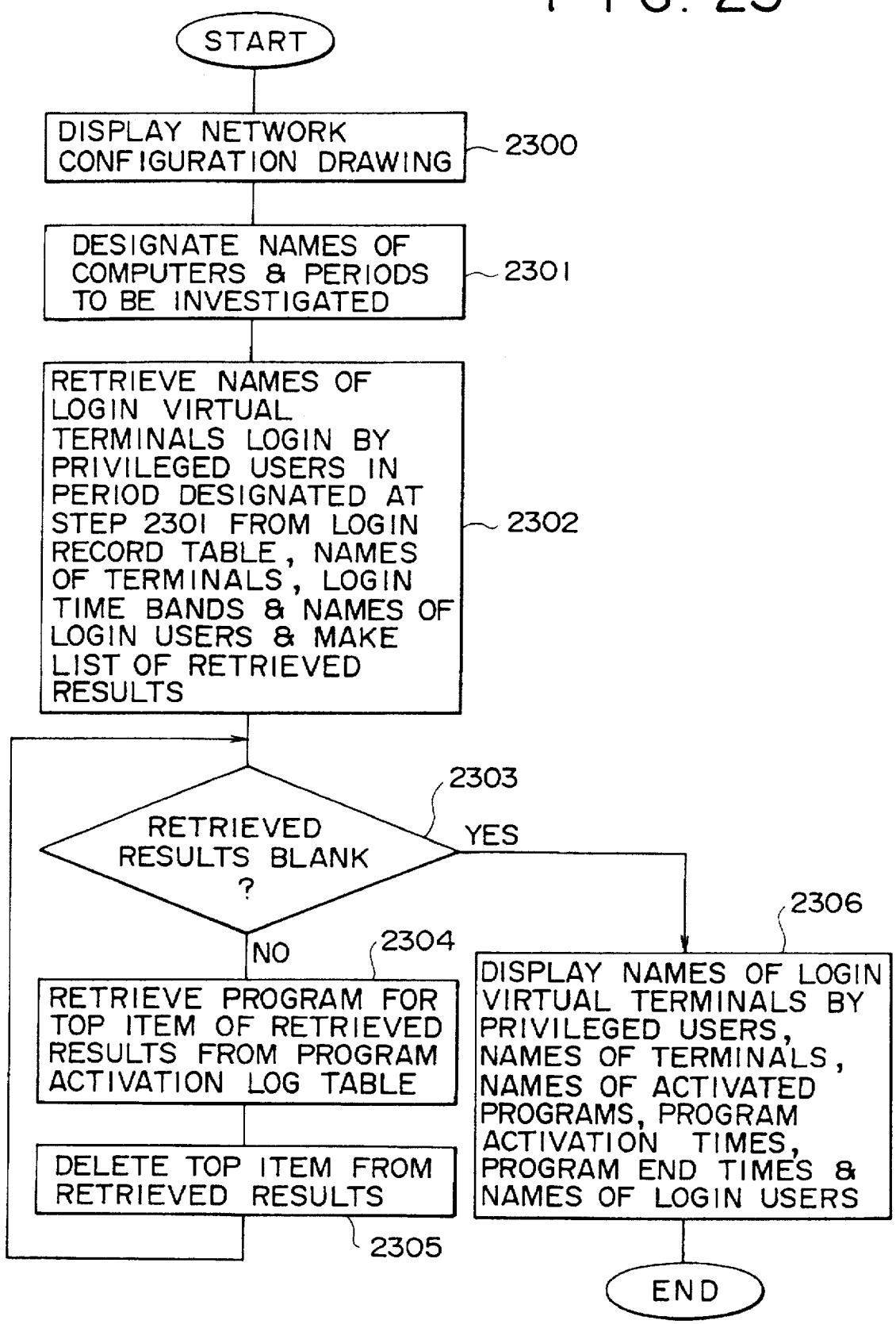
FIG. 23 is a flow chart showing processing procedures for investigating and displaying who has become a privileged user with which terminal at what time and has operated which program, in accordance with an embodiment of the present invention.

Then, a description will be made along the flow chart as shown in FIG. 23 on the processing procedures for investigating which user has become the privileged user at which location during the designated period of time, and has operated which program; and for displaying the result with reference to FIGS. 2, 3, 14, 21, 24 and 25.

FIG. 24 illustrates a table 240 indicating that the login procedure is executed into the privileged user from which name of user at which time during the period of time designated. The table 240 is created during the processing procedures of the flow chart as shown in FIG. 23. FIG. 24 shows the table 240 comprising names of virtual terminals 2400, names of terminals 2401, login time bands 2402, and names of users executing the login procedures into the privileged user, as indicated by reference numeral 2403. If the login procedure is implemented as the privileged user prior of the designated time for commencement of the investigation, the time of commencement of investigation is treated as a login time. On the other hand, if the logout procedure is executed from the privileged user after the investigation has been terminated, the time of the termination of investigation is treated as a logout time.

FIG. 25 illustrates an example of displaying the result of retrieval as to who has become the privileged user at which terminal for a certain period of time and has operated which program. The result comprises names of virtual terminals 2500, names of login terminals 2501, names of activated programs 2502, activation times 2503, end times 2504, and names of login users 2505.

When the login procedure is to be executed into the computer, there may be employed either the name of a login sought to use a usual computer (hereinafter referred to as a "general user") or the name of a login sought to manage such a computer (hereinafter referred to as a "privileged user").

When the login procedure is performed with the privileged user, there can be performed the privileged operations such as an operation for activating all programs on the computers, an operation for forcibly terminating such an operation, an operation for over-writing or deleting all tables and so on.

First, at step 2300 in FIG. 23, there is displayed either the drawing of the logical network configuration as shown in FIG. 2 or the drawing of the physical network configuration as shown in FIG. 3.

Then, at step 2301, there are designated the name of the computer sought to be investigated by the system user and the period of time required for investigation.

Thereafter, at step 2302, the network management system investigates the login records table 140 as shown in FIG. 14 of the computer designated at step 2301 and retrieves the name of the virtual terminal, as indicated by reference numeral 1401, the name of the login terminal 1402, the login time band at which the privileged user has executed the login procedure during the period of time designated at step 2301, as indicated by reference numeral 1403, the logout time band at which the privileged user has performed a logout procedure, as indicated by reference numeral 1404, and names of users prior to the login procedures executed by the privileged users, as indicated by reference numeral 1405. The process at step 2302 gives a list of retrieval as shown in FIG. 24.

Then, the program flow goes to step 2303 at which it is decided to determine if the list of retrieval created at step 2302, as shown in FIG. 24, is blank.

When the result of decision at step 2302 indicates that the list is blank, then the program flow goes to step 2304 at which the program activated with the name of the virtual terminal 2400 in the time band 2402 is detected from the program activation log table 210, as shown in FIG. 21, on the basis of the name of the virtual terminal and the time band in which the privileged user, listed as the top item of the list of the retrieval, has executed the login procedure.

Then, at step 2305, the top item employed at step 2304 is deleted from the list of the results of detection created at step 2302, followed by the return to step 2303.

On the other hand, when the result of decision at step 2303 indicates that the list is not blank, then the program flow goes to step 2306 at which the results of detection at step 2302 are combined in the method as shown in FIG. 25 to thereby create a list comprising names of virtual terminals 2500, names of login terminals 2501, names of activated programs 2502, times at which to activate the program, as indicated by reference numeral 2503, times at which to terminate the program, as indicated by reference numeral 2504, and names of login users 2505, as well as the list is displayed on the output device.

Figure 26:
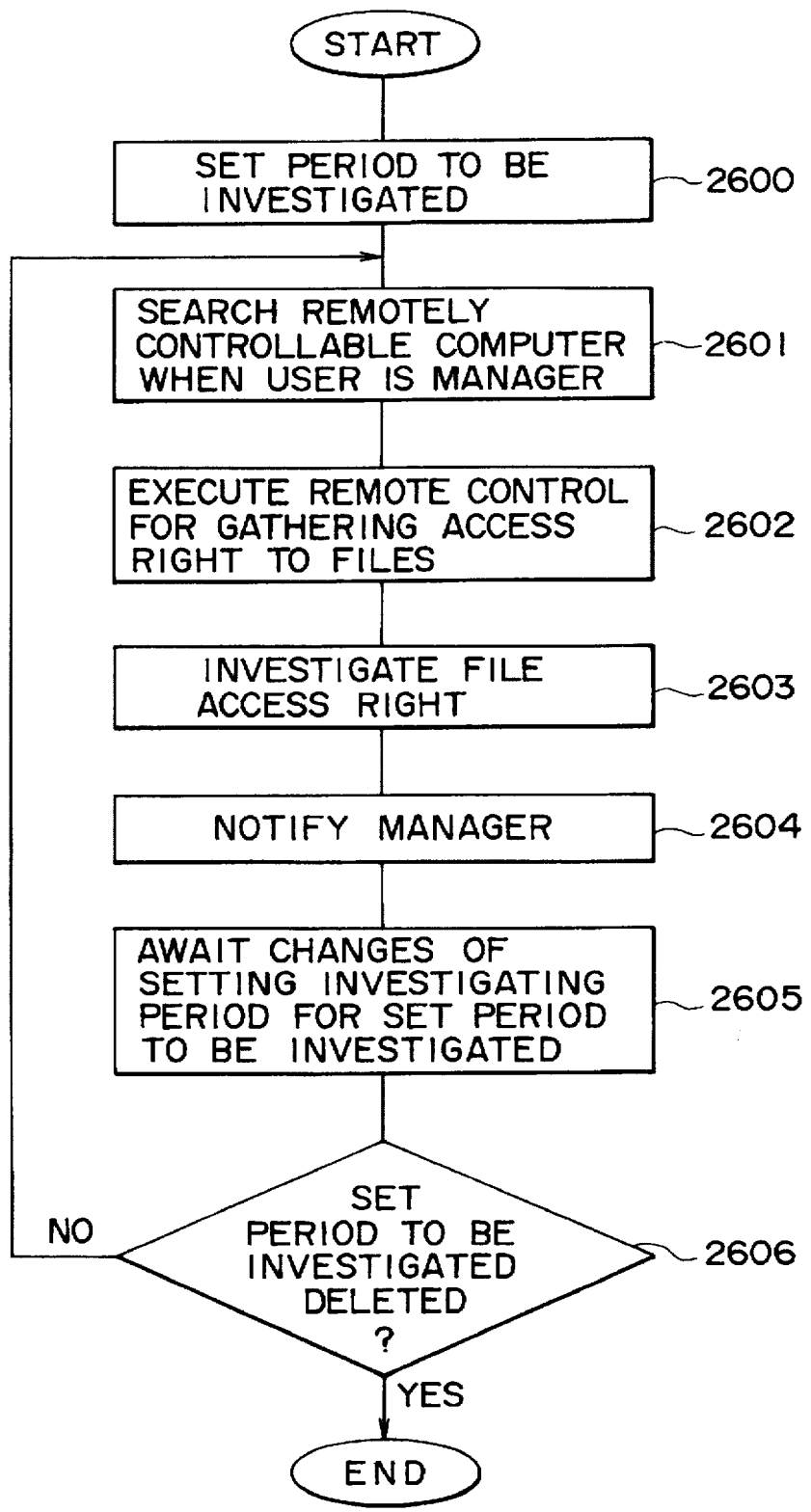
FIG. 26 is a flow chart showing processing procedures for checking an access right to the network environment maintenance file in accordance with an embodiment of the present invention.

Then, a description will be made of the processing procedures for investigating the setting of an access right to make access to a file necessary for the maintenance of the network environment along the flow chart as shown in FIG. 26 with reference to FIGS. 27 to 30.

The network management system according to the present invention is so arranged as to divide the access right to the file into file owners, owners as groups, and other owners by their levels. The file owners refer to users; the owners groups refer to groups of owners (group owners); and the other owners refer to the users other than the file owners and the group owners.

The term "group" or related terms referred to herein is intended to mean a group or groups of plural users sharing a common purpose or purposes, such as all members belonging to the development project of a program or all directors of a company.

The network management system according to the present invention has a database that registers the original access right to the files necessary for the maintenance of the network environment. FIG. 27 illustrates a database 270 that comprises the names of files 2700, the access right to the file owner, as indicated by reference numeral 2701, the access right to the group owner, as indicated by reference numeral 2702, the access right to the other owner, as indicated by reference numeral 2703, the names of the file owners 2704, and the names of the group owners 2705.

The term "file" referred to herein is intended to mean an environment maintenance file for making settings as will be described hereinafter.

As shown in FIG. 27, for example, the file name "/etc/passwd", as represented in column 2700, refers to the file name in which all users for the networks are registered. The file name "/etc/group", as represented in column 2700, refers to the file name in which all groups to which the users are entitled to belong are registered. Further, the file name "/etc/hosts", as represented in column 2700, refers to the file name in which the computers, network devices and peripheral devices on the networks are registered.

FIG. 28 illustrates an example of the concept of the setting of an access right in accordance with the embodiment of the present invention. Column 2800 refers to a field indicating the access right to read, column 2801 to a field indicating the access right to write, and column 2802 to a field indicating the access right to execute. When the bit is "1", the access is allowed. On the other hand, when the bit is "0", the access is not allowed. Hence, an example as shown in FIG. 28 means that the reading process and the writing process are allowed, yet the execution process is not allowed.

At step 2600 in FIG. 26, the network management system according to the present invention requires the user to designate the interval of time for investigating the time settings of the access rights to the files, e.g. every hour or every three days.

Then, at step 2601, a search is made for the item in the database 40 as shown in FIG. 4, satisfying the conditions that the manager of the computer is the user of the network management system and the computer is controllable remotely.

Thereafter, at step 2602, the remote control is carried out for controlling all the computers searched at step 2601 in order to transmit to the network management system the status of the settings of the access rights to the network environment maintenance files stored in the database 50 as shown in FIG. 5 on the basis of the ID of the device to be managed.

FIG. 29 illustrates an example showing the status of the settings of the access rights transmitted from a certain computer.

In FIG. 29, reference numeral 2900 denotes file names, reference numeral 2901 access rights to file owners, reference numeral 2902 access rights to group owners, reference numeral 2903 access rights to users other than the file owners and the group owners, reference numeral 2904 names of the file owners, and reference numeral 2905 names of the groups of the owners.

At step 2603 in FIG. 26, the status of the access rights transmitted at step 2602 is compared with the access rights stored in the database as shown in FIG. 27, thereby creating a comparative result table 300 as shown in FIG. 30.

FIG. 30 illustrates an example of displaying the comparative result table 300 that in turn comprises the IDs of the devices to be managed, as indicated by reference numeral 3000, the names of the network environment maintenance files compared, as indicated by reference numeral 3001, the status of the settings of the access rights transmitted, as indicated by reference numeral 3002, and the original access rights 3003.

When it is decided that there is no discrepancy in the result of comparison, there are stored only the IDs of the devices to be managed, as indicated by reference numeral 3000, and the names of the files 3001.

Then, at step 2604, the network management system notifies the manager of the device to be managed by a mail of the comparative result table 300 created at step 2603.

Further, at step 2605, the process that follows is delayed for the designated period of time for investigation in order to check whether the setting of the period of time designated at step 2600 is changed. Thereafter, at step 2606, the processes from steps 2601 to 2605 are repeated until the information on the period designated at step 2600 is deleted.

Figure 31:
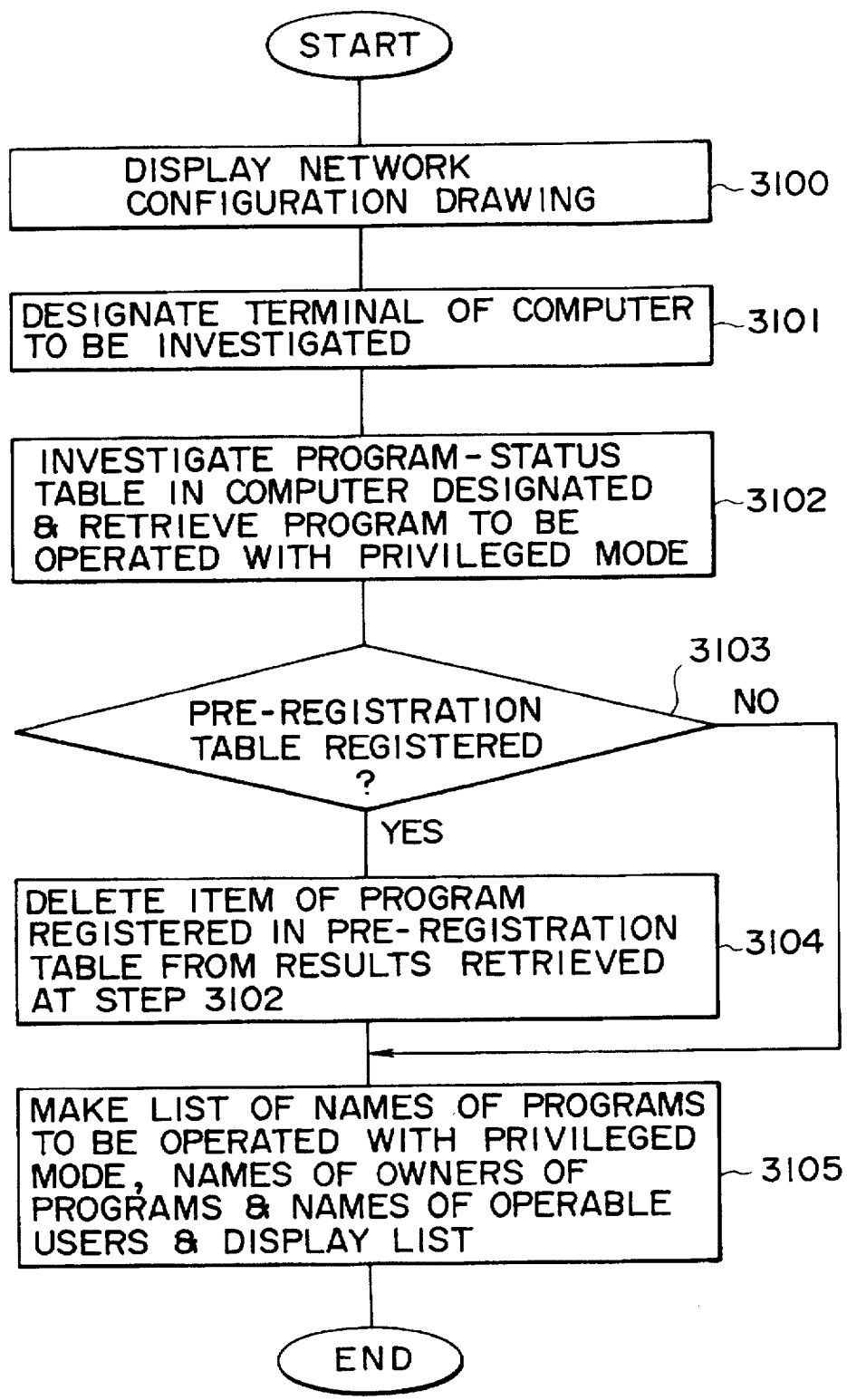
FIG. 31 is a flow chart showing processing procedures for searching and displaying a program which is to be activated with a privileged mode by a general user, in accordance with an embodiment of the present invention.

Then, the processing procedure for searching and displaying the program which the user is authorized to activate with the privileged mode will be described along the flow chart as shown in FIG. 31 with reference to FIGS. 2, 3, and 32–34.

FIG. 32 illustrates a program status table 320 for all the programs in the computers. The computer has a program authorized to be operated with the general mode and a program authorized to be operated with the privileged mode. Further, a certain program may have the limitation to the user who is authorized to activate the program. In other words, such a program may be so arranged as to be operable by the owner only or by another user belonging to the group of the owners who are exclusively authorized to activate the program. Information relating to the operating mode and the limitation to the users who can activate the program is stored in the program status table 320.

As shown in FIG. 32, the program status table 320 comprises a program name for each program, as indicated by reference numeral 3200, the owner of the program, 3201, the user entitled or authorized to activate the program, as indicated by reference numeral 3202, and the running mode during operation, as indicated by reference numeral 3203.

This program status table 320 is held in each of the computers.

FIG. 33 illustrates a table 330 indicating programs which can be authorized to run even if they would be activated with the privileged mode, and those programs are registered by the managers of the networks. When such programs are disclosed in advance, the managers of the networks are requested to register them in advance into the system as in the form of the table 320. This table may be referred to as a pre-registration table.

FIG. 34 illustrates an example of displaying the result of retrieval of the programs which the general user is authorized to activate with the privileged mode.

First, at step 3100 in FIG. 31, there is displayed on the display device the drawing of the logical network configuration as shown in FIG. 2 or the drawing of the physical network configuration as shown in FIG. 3.

Then, at step 3101, the manager of the network is requested to designate the computer which is sought to be investigated as to whether it contains a program which the general user is authorized to activate with the privileged mode.

The program flow then goes to step 3102 at which the system investigates the program status table 320 in the designated computer and retrieves the program which is set for its running mode 3203 to the privileged mode.

Thereafter, step 3103, determines if the pre-registration table 330 is registered. When the result of this step indicates that the pre-registration table 330 is registered, then the program flow goes to step 3304 at which the items of the program registered in the pre-registration table 330 are deleted from the result of retrieval obtained at step 3102.

The program flow further goes to step 3105 at which the program obtained at step 3104 is displayed on the output device, which in turn comprises a list of names of programs 3400, program owners 3401, and users authorized to activate the program, as indicated by reference numeral 3402. After step 3105, the program ends.

On the other hand, when the result of the decision at step 3103 indicates that the pre-registration table 330 is not registered, then the program flow goes to step 3105 at which the program obtained at step 3104 is likewise displayed on the output device.

Further, at step 3103, the list may be displayed in such a method as being transmitted by mail to the managers of the networks, instead of displaying it on the output device.

Figure 35:
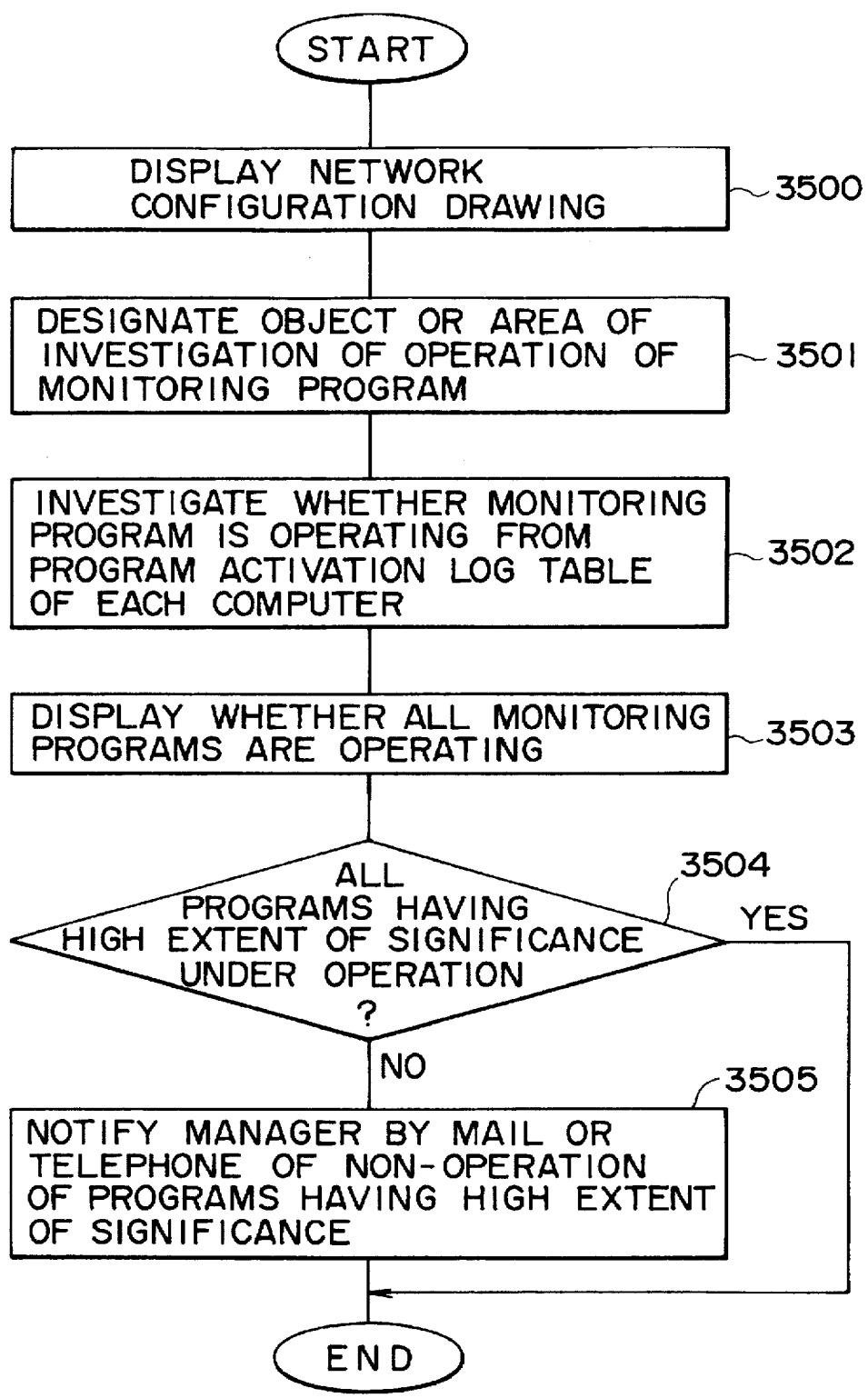
FIG. 35 is a flow chart showing processing procedures for investigating and displaying whether a monitoring program is being operated, in accordance with an embodiment of the present invention.

Now, a description will be made of the processing procedures for investigating whether the monitoring program is being operated with which computer on the network and displaying the result of investigation along the line of the flow chart as shown in FIG. 35 with reference to FIGS. 2, 3, and 36–39.

The monitoring program referred to herein may be intended to mean a program for monitoring the operation of a program to which unauthorized access is made or is tried to be made from the outside or inside and for notifying the manager of the network of the result of monitoring. This monitoring program is required for each of the managers of the networks to set it so as to operate each of the computers on the networks. An example of the monitoring tables to be registered in advance in the system by each of the managers of the networks is illustrated in FIG. 36 which shows a table 360 comprising the names of the computers in which the monitoring program is being operated, as indicated by reference numeral 3600, the names of the monitoring programs to be operated by the corresponding computers, as indicated by reference numeral 3601, and the extent of significance of the monitoring program, as indicated by reference numeral 3602. This table is referred to herein as a monitoring programs registration table 360.

Figure 37:
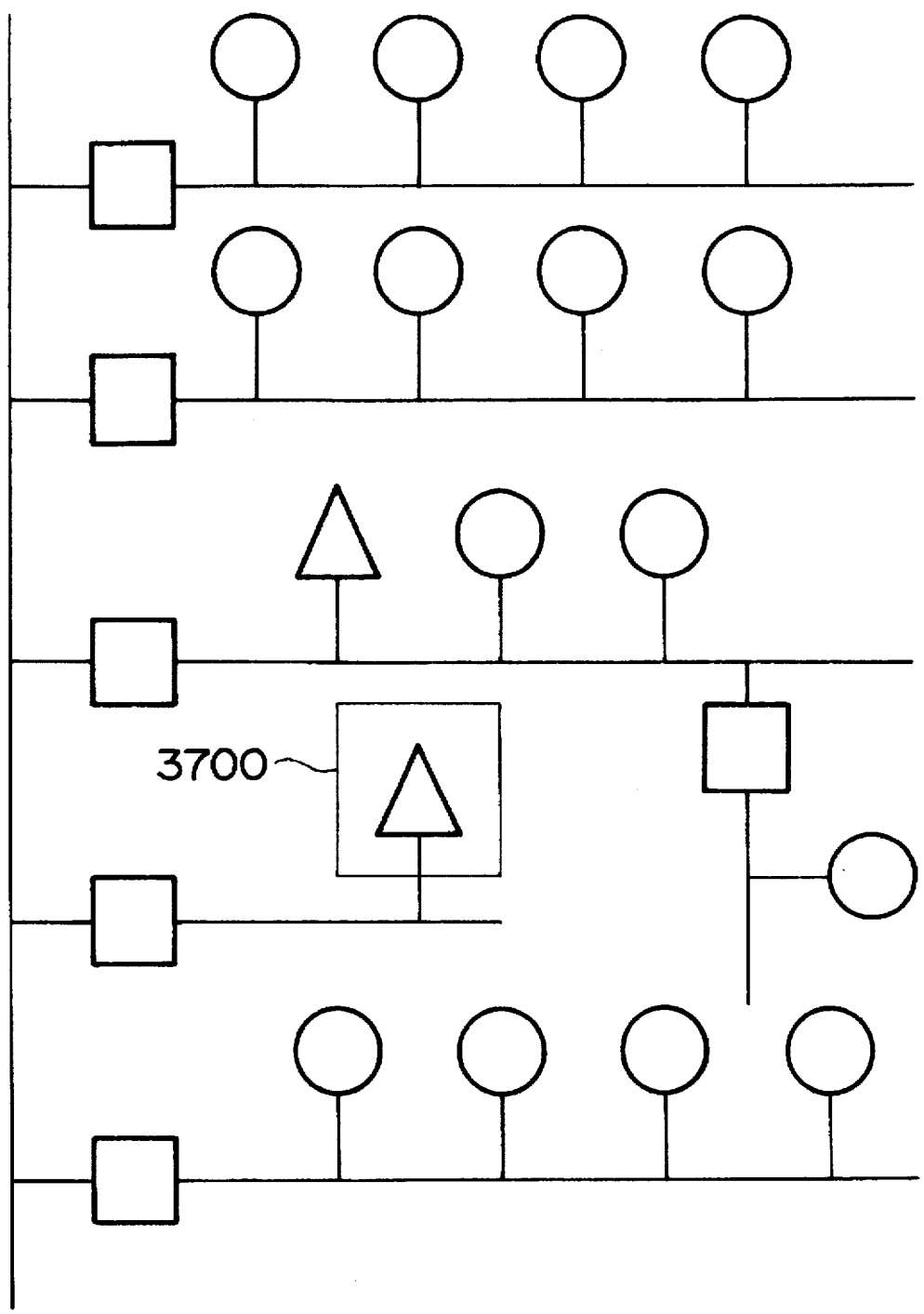
FIG. 37 is a diagram showing an example of designating a computer serving as the object of investigation in accordance with an embodiment of the present invention.
Figure 38:
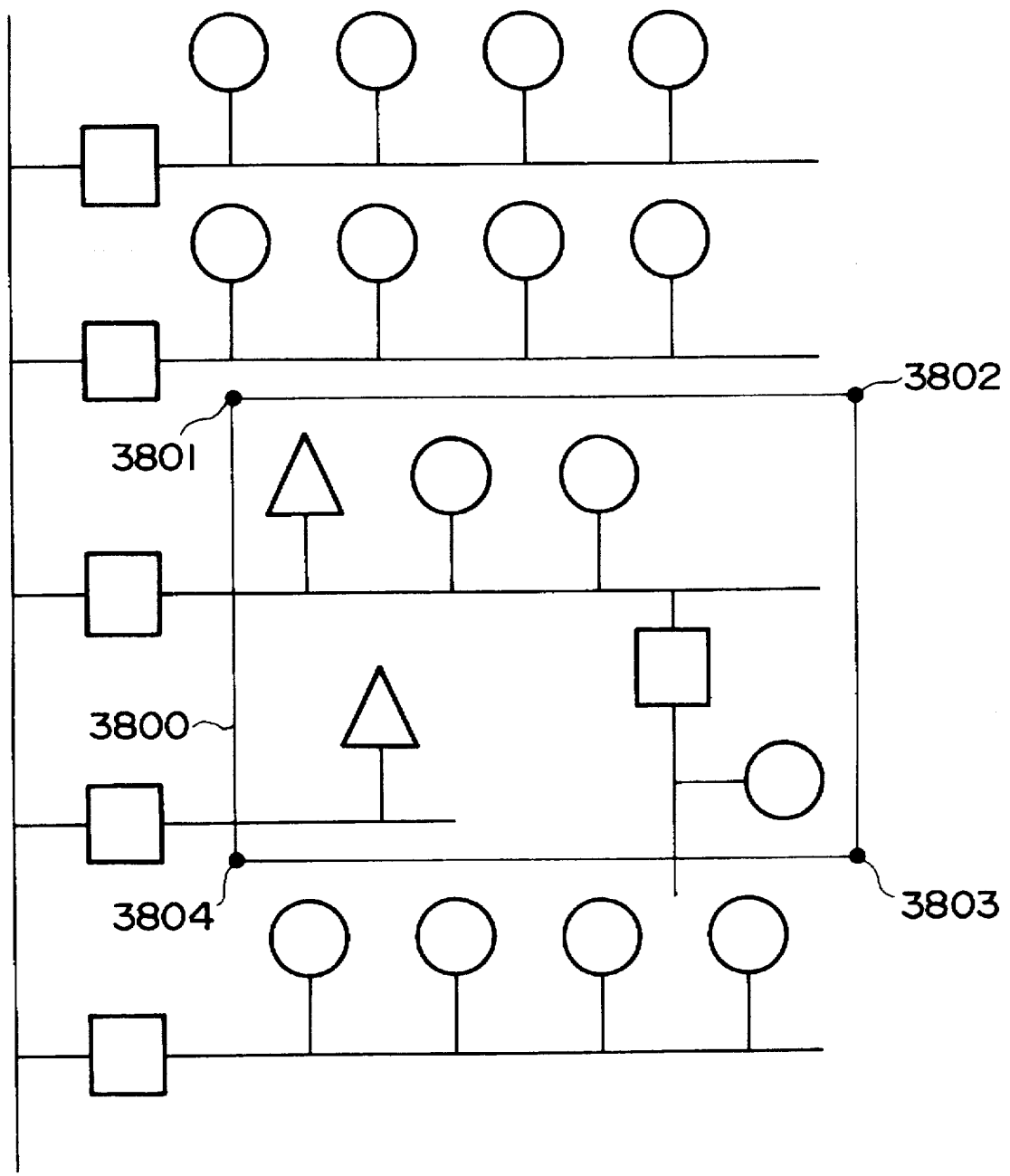
FIG. 38 is a diagram showing an example of designating an area of the object of investigation in accordance with an embodiment of the present invention.
Figure 39:
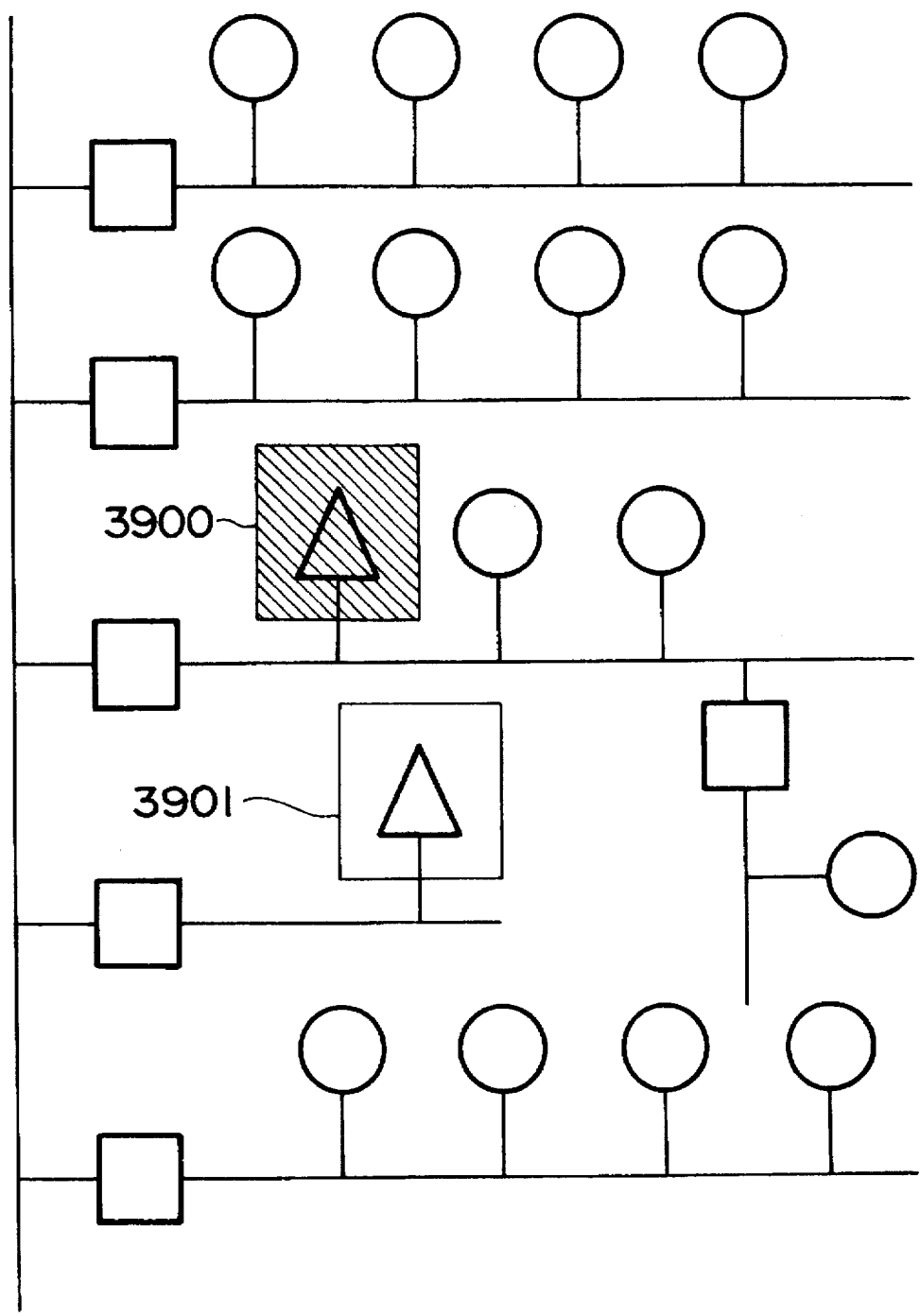
FIG. 39 is a diagram showing an example of displaying whether all monitoring programs designated are under operation.

FIGS. 37 and 38 refer to examples of the designation of the objects of investigation, and FIG. 39 refers to an example of the display of the results of investigation as to whether all the monitoring programs are being operated.

First, at step 3500 in FIG. 35, there is displayed on the output device the drawing of the logical network configuration as shown in FIG. 2 or the drawing of the physical network configuration as shown in FIG. 3.

Then, at step 3501, the user of the system is requested to designate the object or an area of investigation as to whether the monitoring program is being operated. The object or area of the investigation may be designated by identifying a computer 3700 as shown in FIG. 37 or an area 3800 as shown in FIG. 38.

The program flow further goes to step 3502 at which the program activation log table 210 (FIG. 21) is investigated on each of the computers designated and the status of the operations of the program contained in the monitoring program registration table 360 (FIG. 36) is retrieved.

Thereafter, at step 3503, whether all the monitoring programs are being operated or not is displayed on the output device in such a method that the computer in which all the monitoring programs are being operated in an ordinary method can be distinguished from the computer in which a certain monitoring program is not being operated in an ordinary method on the drawing of the network configuration displayed at step 3500. For instance, as shown in FIG. 39, the computer in which all the monitoring programs are being operated in an ordinary method may be displayed in such a method as marked with slanting lines, as indicated by reference numeral 3900, and the computer in which some monitoring program is not working may be displayed in such a method as enclosed with a frame, as indicated by reference numeral 3901. In addition, there is no limitation to the method for the distinction of the computer with all the monitoring programs working normally from the computer with some monitoring program inactive or working in an abnormal way. For example, the methods may include the method of distinction by changing colors or by varying degrees of brightness.

The program flow then goes to step 3504 at which it is investigated in the table 360 in FIG. 36 if all the monitoring programs having the extent of significance under column 3602 set as "High" are being operated by comparing the results of retrieval obtained at step 3502 with the monitoring programs registration table 360 as shown in FIG. 36. When the result of investigation at step 3504 indicates that some significant monitoring program is not currently under operation, then the program flow goes to step 3505 at which the manager is notified directly by mail or telephone call of the result of investigation that the monitoring program designated as having the "High" extent of significance is not working or not under operation.

After step 3505, the program ends. On the other hand, when it is decided at step 3504 that the monitoring program designated as having the "High" extent of significance is working or under operation, then the program likewise ends.

Figure 45:
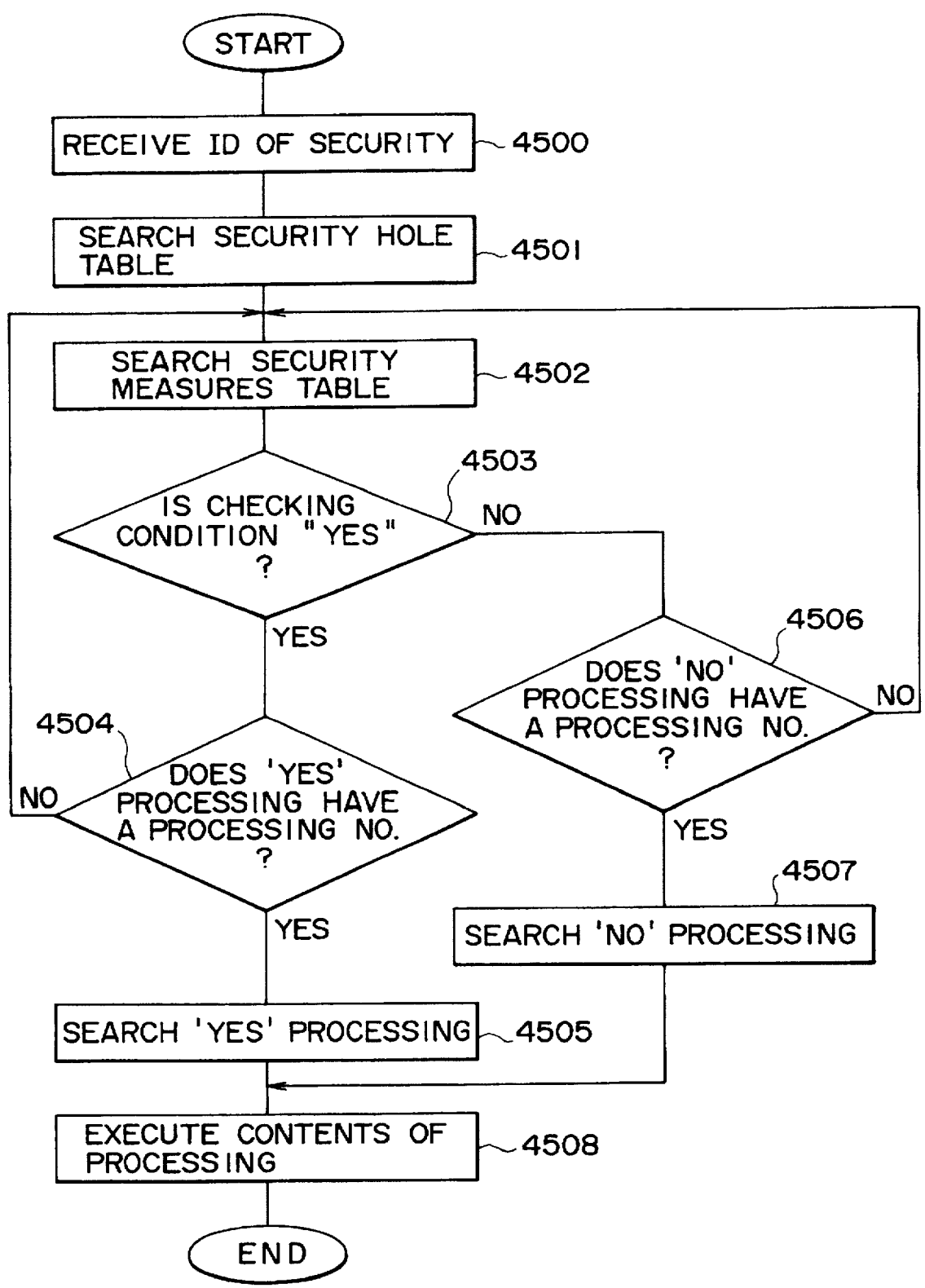
FIG. 45 is a flow chart showing processing procedures for taking measures against a detected security hole of a network management system according to an embodiment of the present invention.

When the network management system according to the present invention detects a security hole on the networks, appropriate measures should be taken in order to ensure a satisfactory extent of security against the security hole. Hence, a description will now be made of the measures to be taken for ensuring security against the security hole along the flow chart as shown in FIG. 45 with reference to FIGS. 40–44.

FIG. 40 illustrates an example of the contents of a security hole table 400 which comprises, for example, the IDs of security 4000 and the IDs of security measures 4002, each being added to the contents of the security holes, as indicated by reference numeral 4001.

FIG. 41 illustrates the contents of the security hole table 410 which comprises, for example, the IDs of security measures 4100, the contents of checking the security holes, as indicated by reference numeral 4101, the YES processing numbers indicating the processing contents when the checked contents under column 4101 show YES, as indicated by reference numeral 4102, and the NO processing numbers indicating the processing contents when the checked contents under column 4101 show NO, as indicated by reference numeral 4102.

Further, when a plurality of the checking items are required for ensuring a satisfactory extent of security against the security hole on the network, both of the YES processing numbers and the NO processing numbers may be provided with the IDs of the security measures.

FIG. 42 illustrates the contents of a YES/NO processing table 420 which comprises processing numbers 4200 and processing contents 4201.

FIG. 43 illustrates the contents of a managers table 430 which registers IDs of managers 4300, names of managers 4301, and positions of the managers 4302.

FIG. 44 illustrates the contents of an external users table 440 in which external users are registered who are allowed to make access to the networks serving as the objects of management of the network management system from an external network outside the objects of management.

As shown in FIG. 44, the external users table 440 may comprise IDs of external users 4400, names of external networks 4401, names of users 4402, and positions of the users 4403.

The network management system according to the present invention has the function of notifying the manager of a security hole on the network as to the processing procedure for taking security measures as will be described hereinafter, as well as the functions of performing the processing procedures as described hereinabove, in other words, the processing procedures for monitoring the network environment at all times, detecting a security hole of the network, and displaying the detected security hole thereof on the drawing of the network configuration. Hence, the processing procedure for taking the measures against the security hole in the method as will be described hereinafter is initiated from the point at which a notice is given for the security measures processing.

The measures for ensuring security against the security hole are taken in the method, for example, as shown in FIG. 45.

First, at step 4500, a notice of the security ID of a security hole detected is received, followed by proceeding to step 4501 at which a search is made for the security hole table 400 as shown in FIG. 40 on the basis of the security ID notified, thereby retrieving the ID of the security measures involved.

Then, at step 4502, a search is made for the security measures table 410 as shown in FIG. 41 on the basis of the ID of the security measures retrieved at step 4501, thereby providing a condition of checking the security hole of the network.

Thereafter, step 4503 determines if the checking condition is YES. In this case, as needed, the status of operating the process may be confirmed on the basis of the program activation log table 210 as shown in FIG. 21 or an investigation may be performed on the basis of the manager table 430 as shown in FIG. 43 as to whether the person who caused such a security hole to occur is a manager, or an investigation may be performed on the basis of the external users table 440 as shown in FIG. 44 as to whether the external user is authorized to make access.

When the result of the decision at step 4503 indicates that the checking condition is YES, then the program flow goes to step 4504 at which it is further decided to determine if the YES processing is provided with the processing number. When this decision gives the NO result, that is, it is decided that the contents stored in the YES processing are directed to the ID of the security measures, then the program flow returns to step 4502 in order to make a search for the security measures table 410. These procedures are repeated until the contents stored in the YES processing are provided with the processing number.

On the other hand, when it is decided at step 4504 that the YES processing has the processing number, that is, the processing number is stored in the YES processing, then the program flow goes to step 4505 at which a search is made for the YES/NO processing table 420 as shown in FIG. 42 on the basis of the processing number involved, followed by proceeding to step 4508.

If the result of the decision at step 4503 indicates that the checking condition is NO, then the program flow goes to step 4506 at which it is decided to determine if the NO processing is provided with the processing number. When this decision gives the NO result, that is, it is decided that the contents stored in the NO processing are directed to the ID of the security measures, then the program flow returns to step 4502 at which a search is made for the security measures table 410. Then, these procedures are repeated until the contents stored in the NO processing are provided with the processing number.

On the other hand, when it is decided at step 4506 that the NO processing is provided with the processing number, then the program flow goes to step 4507 at which a search is made for the YES/NO processing table 420 as shown in FIG. 42 on the basis of the processing number determined at step 4506, followed by proceeding to step 4508.

When the processing contents are provided as a search for the YES/NO processing table 420 at step 4505 or at step 4507, then the processing contents are executed at step 4508 to thereby take the measures for ensuring security against the security hole on the network.

As described hereinabove, the network management system according to the present invention can offer the advantages and effects as will be described hereinafter.

1. The network management system can detect a software security hole and display the detected software security hole on the drawing of the network configuration, thereby ensuring security on the network.

2. The network management system can monitor the status of accesses to the networks and the network devices at all times, thereby discovering an unauthorized entry from the outside or an unauthorized usage from the inside within a short period of time.

3. The network management system can collate and investigate the contents of a file for setting a network environment on the basis of a condition of allowing such access, thereby facilitating the configuration of an appropriate environment for the utilization of the network.

4. The network management system can display the network device as an object of management of the network on the drawing of the network configuration in a distinguishable form, thereby visually grasping and identifying a safe network environment with ease.

What is claimed is:

1. A network management system for managing and operating a network having a plurality of network devices containing a computer connected therewith, comprising:

a database for storing information relating to a physical arrangement of said network devices and a relationship of connection thereof;

a display device for displaying a drawing of a network configuration;

first detection means for detecting a security hole of the network, said security hole being selected from the group consisting of an access point with an external network, a condition of allowing access to an external network, a deviation of contents of a communication traveling on the network, network occupancy by a particularly defined user, program, or command, a security level or user right for a program or group of commands operated by a user employing a network device connected in the network, a condition of allowing access to a network device other than a computer connected in the network, a condition of allowing access to a program or command subject to a privileged user right defined by the network device, a condition of allowing access of the network device to information for setting an access condition, a security level or a user right for a program or a group of commands being operated in the network, an activation of a program or a command with a privileged user right, and an internal logical network separate from the overall network system management;

means for displaying the security hole, detected by said first detection means, on the display device, on one of a drawing of a logical network configuration and a drawing of a physical network configuration on the basis of the information stored in said database, in a display state suitable for showing contents of the security hole or an extent of significance of the security hole; and processing means for taking a necessary measure against the security hole by consulting a security measures table.

2. A network management system as claimed in claim 1, further comprising means for displaying a dynamic and logical status of connection of one of the plurality of network devices on the basis of information stored in said database relating to one of a physical network configuration, a logical network configuration, a network wiring layout, a floor drawing, and a map, when an instruction is given to the computer, said one of the network devices, or a position thereof displayed on said drawing of the network configuration.

3. A network management system as claimed in claim 1, further comprising:

measurement means for measuring an amount of communication of the network among the computer and one of the network devices through a network cable connecting the computer and said one of the network devices, when an instruction is given to the computer, said one of the network devices, or the network cable, displayed on the drawing of the network configuration;

classification means for classifying contents of communication;

computation means for computing a rate or a ratio of an amount of communication for each classification; and means for displaying a periodic progress and a variation of the amounts of communication with respect to the total amount of communication on the basis of the result of measurement and the result of classification in a distinguishable form on said display device.

4. A network management system as claimed in claim 1, further comprising:

second detection means for detecting a dynamic and logical status of a login procedure executed by a user on the basis of the information relating to the physical network configuration or the logical network configuration, stored in said database, when an instruction is given to the computer or one of the network devices displayed on said drawing of the network configuration; and means for displaying said dynamic and logical status thereof.

5. A network management system as claimed in claim 1, further comprising:

storage means for storing a history of access to a file for setting an environment for maintaining a network environment defined with the computer or one of the network devices on the network in said database at selected times;

extraction means for extracting a history of access made for a predetermined period of time from said history of the access thereto stored in the database, when an instruction is given to the computer or said one of the network devices displayed on the drawing of the network configuration; and means for displaying a result of extraction on said display device.

6. A network management system as claimed in claim 1, further comprising:

storage means for storing a program or a command at selected times in said database;

collating and investigating means for collating and investigating or checking programs or commands operable with the computer and one of the network devices to which an instruction is to be given at selected times, with respect to whether said programs or said commands contain a program or a command which fails to agree with a preregistration table for allowing the program or the command to be operated on the network while security is ensured on the network, said security being defined with the computer or said one of the network devices on the network; and means for displaying the status of the operation of the programs or the commands stored in said database on the display device when the instruction is given to the computer or said one of the network devices displayed on the drawing of the network configuration.

7. A network management system as claimed in claim 1, further comprising:

storage means for storing a history of login procedures to the network executed by a privileged user defined with the computer or one of the network devices on the network in the database at selected times;

extraction means for extracting a history of the login procedures executed by the privileged user stored in said database for a predetermined period of time from the history of the login procedures, when an instruction is given to the computer or said one of the network devices displayed on the drawing of the network configuration; and means for displaying a result of extraction on said display device.

8. A network management system as claimed in claim 1, further comprising:

collating and investigating means for collating and investigating or checking contents of an environment setting file for connection to the network defined by the computer and one of the network devices so as to comply with information relating to a condition of accepting access to the network, the information being stored in advance in the database, when an instruction is given to the computer or said one of the network devices displayed on the drawing of the network configuration;

means for displaying a result of collating and investigating or checking on the display device; and notice means for giving a notice in accordance with the extent of significance of the security hole.

* * * * *